United States Patent
Geiser et al.

(10) Patent No.: US 9,442,205 B2
(45) Date of Patent: Sep. 13, 2016

(54) METHOD FOR ASSESSING THE EFFECTIVENESS OF MODIFYING TRANSMISSIVE NETWORKS OF NATURAL RESERVOIRS

(71) Applicant: Global Geophysical Services, Inc., Missouri City, TX (US)

(72) Inventors: Peter Anderson Geiser, Boulder, CO (US); Jan Meredith Vermilye, Lyons, CO (US); Charles John Sicking, Plano, TX (US)

(73) Assignee: Global Ambient Seismic, Inc., Missouri City, TX (US)

( * ) Notice: Subject to any disclaimer, the term of this patent is extended or adjusted under 35 U.S.C. 154(b) by 613 days.

(21) Appl. No.: 13/831,619

(22) Filed: Mar. 15, 2013

(65) Prior Publication Data

US 2013/0215712 A1 Aug. 22, 2013

Related U.S. Application Data

(63) Continuation-in-part of application No. 13/070,442, filed on Mar. 23, 2011.

(60) Provisional application No. 61/778,358, filed on Mar. 12, 2013.

(51) Int. Cl.
*G01V 1/06* (2006.01)
*G01V 1/30* (2006.01)
*G01V 1/28* (2006.01)
*G01V 1/42* (2006.01)

(52) U.S. Cl.
CPC .............. *G01V 1/308* (2013.01); *G01V 1/288* (2013.01); *G01V 1/42* (2013.01); *G01V 2210/1234* (2013.01)

(58) Field of Classification Search
USPC ............................................... 367/9
See application file for complete search history.

(56) References Cited

U.S. PATENT DOCUMENTS

| | | | |
|---|---|---|---|
| 5,390,291 A | 2/1995 | Ohashi | |
| 5,884,229 A | 3/1999 | Matteucci | |
| 6,389,361 B1 | 5/2002 | Geiser | |
| 6,516,274 B2 | 2/2003 | Cheng et al. | |
| 6,985,816 B2 | 1/2006 | Sorrells et al. | |
| 7,069,149 B2 | 6/2006 | Goff et al. | |
| 7,127,353 B2 | 10/2006 | Geiser | |
| 7,391,675 B2 | 6/2008 | Drew | |
| 7,660,199 B2 | 2/2010 | Drew | |
| 7,663,970 B2 | 2/2010 | Duncan et al. | |
| 2002/0007247 A1* | 1/2002 | Cheng et al. | 702/17 |
| 2003/0112704 A1* | 6/2003 | Goff et al. | 367/72 |
| 2004/0014212 A1* | 1/2004 | Elliott et al. | 435/373 |

(Continued)

OTHER PUBLICATIONS

Directional 3D Thinning Using 8 Subiterations, Kalman Palagyi and Attila Kuba, DGCI'99, LNCS 1568, 325-336 (1999).

(Continued)

*Primary Examiner* — James Hulka
(74) *Attorney, Agent, or Firm* — Edward Eugene Thigpen

(57) ABSTRACT

Described herein are various embodiments of methods and corresponding hardware and software that are configured to illuminate or image the permeability field around or near a well that is to be fracked, both prior to fracking and after various fracking stages. The methods and corresponding hardware and software disclosed herein permit the progress of the fracking operation to be monitored at different stages.

19 Claims, 13 Drawing Sheets

(56) References Cited

U.S. PATENT DOCUMENTS

| | | | |
|---|---|---|---|
| 2004/0151356 A1* | 8/2004 | Li et al. | 382/131 |
| 2005/0060099 A1* | 3/2005 | Sorrells et al. | 702/14 |
| 2006/0047431 A1* | 3/2006 | Geiser | 702/12 |
| 2006/0062084 A1* | 3/2006 | Drew | 367/68 |
| 2008/0043024 A1* | 2/2008 | Schiwietz et al. | 345/442 |
| 2008/0068928 A1* | 3/2008 | Duncan et al. | 367/73 |
| 2008/0259727 A1* | 10/2008 | Drew | 367/25 |
| 2009/0076388 A1* | 3/2009 | Napoli et al. | 600/437 |
| 2009/0122061 A1* | 5/2009 | Hammon, III | 345/424 |
| 2010/0149917 A1 | 6/2010 | Imhof et al. | |
| 2010/0161232 A1 | 6/2010 | Chen et al. | |
| 2011/0002194 A1* | 1/2011 | Imhof et al. | 367/53 |
| 2011/0048731 A1* | 3/2011 | Imhof et al. | 166/369 |
| 2012/0090834 A1* | 4/2012 | Imhof et al. | 166/250.01 |
| 2012/0243368 A1* | 9/2012 | Geiser et al. | 367/9 |
| 2013/0128693 A1* | 5/2013 | Geiser | 367/27 |
| 2013/0128694 A1* | 5/2013 | Lacazette et al. | 367/27 |
| 2013/0215712 A1* | 8/2013 | Geiser et al. | 367/9 |

OTHER PUBLICATIONS

Direct Mapping of Reservoir Permeability Fields, Peter Geiser, Jan Vermilye, Rob Scammell and Steve Roecker, Oil & Gas Journal, Dec. 2006.

The process zone: A microstructurel view of fault growth, jan M. Vermilye and Christopher H. Scholz, Jml. of Geophysical Research, 1998, vol. 103, No. B6, pp. 12,223-12,237.

A Continuous Skeletonization Method Based on Level Sets, Martin Rumpf, Alexandru Telea, Joint Eurographics—IEEE TCVG Symposium on Visualization (2002).

Marching Cubes: A high resolution 3D surface construction algorithm, William E. Lorensen, Harvey E. Cline, Siggraph 87 Proceedings, ser Computer Graphics, vol. 21, Nr. 4, 163-1.

Seismic Skeletonization: A Useful Tool for Data Analysis, K. Vasudevan, F.A. Cook and D.W. Eaton, CSEG Recorder, Nov. 2006, 37-42.

An iterative approach to seismic skeletonization, Shin-yee Lu and Yoa-chou Cheng, Geophysics, vol. 55, 1312-1320 (1990).

* cited by examiner

TFI SYSTEMS DEFINED BY CUT-OFF (CO) VALUE RANGES

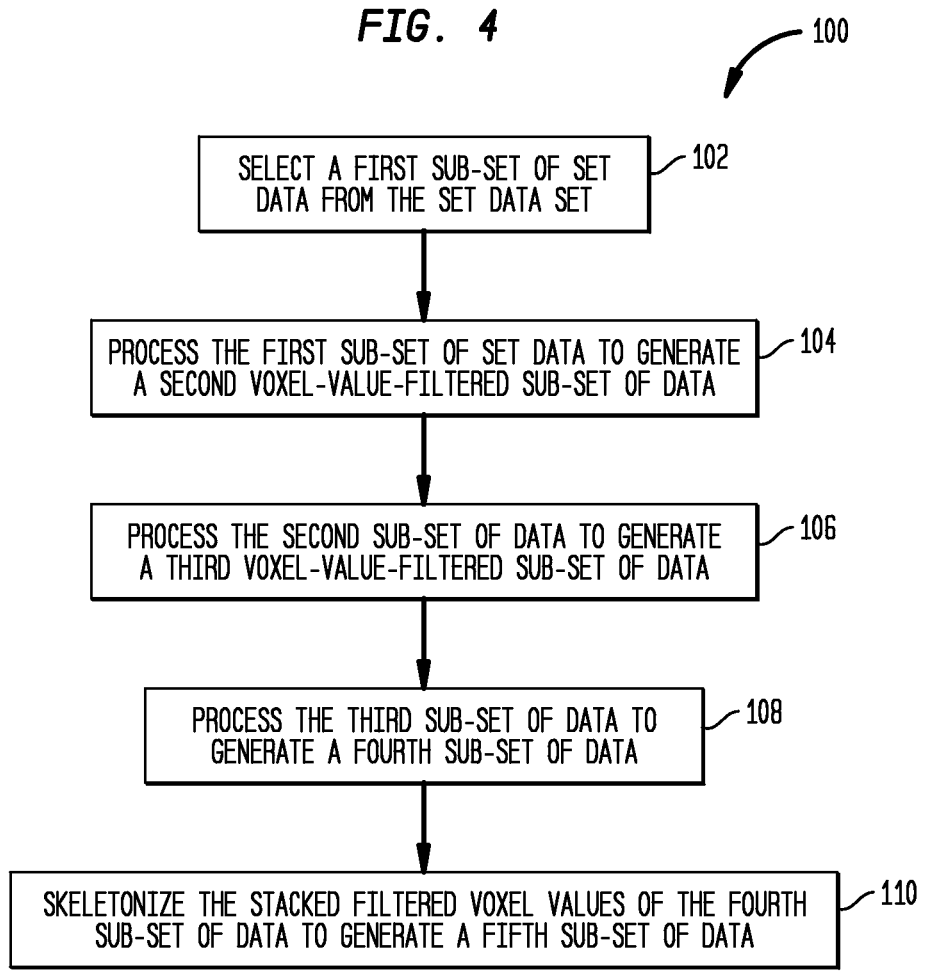

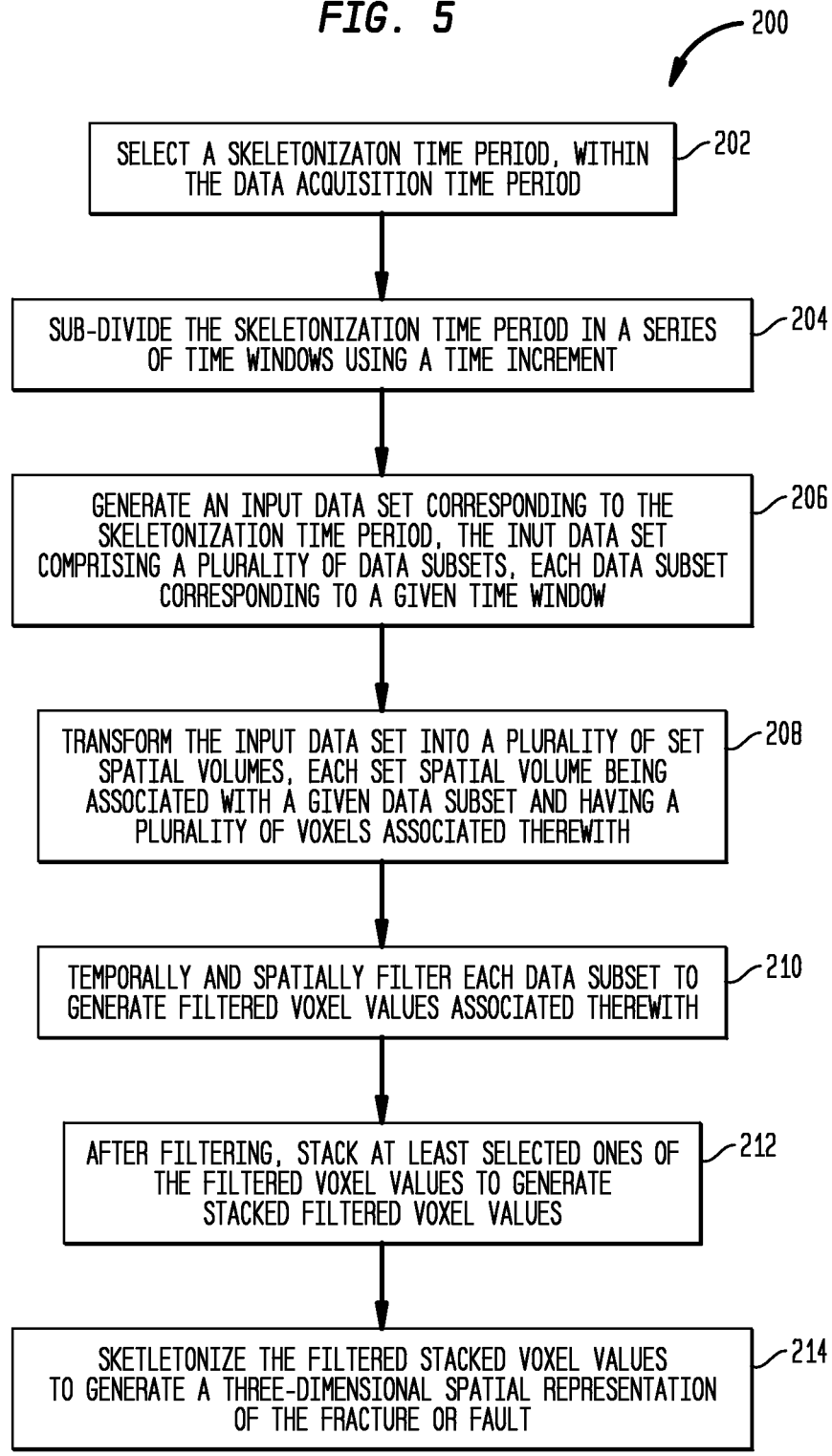

METHOD 2: TREATMENT AT Pf < Shmin

METHOD FOR ASSESSING THE EFFECTIVENESS OF MODIFYING TRANSMISSIVE NETWORKS OF NATURAL RESERVOIRS

RELATED APPLICATIONS

This application is a continuation-in-part of, and claims priority and other benefits from, U.S. patent application Ser. No. 13/070,442 entitled "Fracture Imaging Methods Employing Skeletonization of Seismic Emission Tomography Data" to Geiser et al. filed Mar. 24, 2011. This application also claims priority and other benefits from U.S. Provisional Patent Application Ser. No. 61/778,358 entitled "Method for Assessing the Effectiveness of Modifying Transmissive Networks of Natural Reservoirs" to Geiser et al. filed Mar. 12, 2013. Each of the foregoing patent applications is hereby incorporated by reference, each in its respective entirety. This application also hereby incorporates by reference in its entirety U.S. patent application Ser. No. 13/831,591 filed on Mar. 15, 2013 entitled "Methods, Systems and Devices for Near-Well Fracture Monitoring Using Tomographic Fracture Imaging Techniques" to Vermilye et al., which describes and discloses some of the "Near Real Time TFI" methods discussed below.

FIELD

Various embodiments described herein relate to the field of seismic data acquisition and processing, and devices, systems and methods associated therewith.

BACKGROUND

For the first 100 years and more of oil exploration and production, wells were drilled almost exclusively in geologic formations that permitted production of oil and gas flowing under the natural pressures associated with the formations. Such production required that two physical properties of the geologic formation fall within certain boundaries. The porosity of the formation had to be sufficient to allow a substantial reserve of hydrocarbons to occupy the interstices of the formation, and the permeability of the formation had to be sufficiently high that the hydrocarbons could move from a region of high pressure to a region of lower pressure, such as when hydrocarbons are extracted from a formation. Typical geologic formations having such properties include sandstones.

In recent years, it has become apparent that large reserves of hydrocarbons are to be found in shale formations. Shale formations are typically not highly permeable, and therefore present formidable obstacles to production. The most common technique in use today that permits economic production of hydrocarbons, and especially natural gas from shale formations, is hydraulic fracturing (often referred to as "fracking"). This technique can be also be applied to older wells drilled through non-shale formations to increase the proportion of hydrocarbons that can be extracted from them, thus prolonging well life.

Fracking involves pumping fluid under very high pressure into hydrocarbon-bearing rock formations to force open cracks and fissures and allow the hydrocarbons residing therein to flow more freely. Usually the fluids injected into such formations contain chemicals to improve flow, and also contain "proppants" (an industry term for substances such as sand). When the fracturing fluid is removed, and the hydrocarbons are allowed to flow, the sand grains prop open the fractures and prevent their collapse, which might otherwise quickly stop or reduce the flow of hydrocarbons.

Drilling technology has evolved to allow wells to be drilled along virtually any direction or azimuth, and is no longer constrained to the drilling of vertical wells only. Deviated wells are thus often drilled along specific geologic formations to increase production potential. The extent of a hydrocarbon-producing formation in a vertical well may be measured in feet, or perhaps tens or hundreds of feet in highly productive areas. The maximum area of the formation in contact with the vertical well bore is quickly computed as the circumference of the well multiplied by the height of the producing formation. In practice, the producing area is much less than this figure. By drilling horizontally or non-vertically through a formation, the extent of the formation in contact with the wellbore can be much greater than is possible with vertically-drilled wells. Injecting deviated wells with hydraulic fracturing fluid can result in the propagation of fractures outwardly from the wellbore, and thereby increase significantly the total volume of the subsurface from which the hydrocarbons can be extracted.

The progress of a fracturing operation must be monitored carefully. Well fracturing is expensive, and the fracturing process is frequently halted once its benefits become marginal. The high pressures associated with fracturing result in fractures that tend to follow existing faults and fractures, and can result in an uneven or unpredictable fracture zone. Fracturing fluid may also begin following an existing fault or fracture zone and then propagate beyond the intended fracture zone. Care must also be taken not to interfere with existing production wells in the area. For these and other reasons, it is important that the fracturing operator be permitted to follow accurately the progress of the fluid front in the subsurface while the fluid is being injected into the well.

Conventional surface seismic reflection surveys generally do not work well for monitoring the movement or positions of fluid fronts in the subsurface. The physical dimensions of fractures are often shorter than can be detected using conventional surface seismic reflection techniques. In addition, within a given formation there may be no or low contrasts in seismic velocity, and as a result surface seismic reflection techniques cannot be used effectively to image fractures within the formation. Fractures also tend to scatter seismic energy, further obscuring their detection by conventional surface seismic reflection means.

An alternative approach to the problem of imaging factures or fluid fronts within formations known as "microseismicity" has its origins in earthquake seismology and in technology developed to monitor nuclear tests. Instead of using "active" surface seismic energy sources, "passive seismic" techniques are used to detect seismic energy generated in the subsurface of the earth. Seismic energy emitted by fracturing a geologic formation, which is caused by the injection of high pressure fracturing fluid into the formation, is sensed and recorded. The objective then becomes determining the point of origin of the emitted seismic energy, which defines the location of the fracture.

One method of locating fractures and faults in geologic formations is known as Seismic Emission Tomography (SET). Examples of SET techniques and processes are described in U.S. Pat. No. 6,389,361 to Geiser entitled "Method for 4D permeability analysis of geologic fluid reservoirs" (hereafter "the '361 patent") and in U.S. Pat. No. 7,127,353 to Geiser entitled "Method and apparatus for imaging permeability pathways of geologic fluid reservoirs using seismic emission tomography" (hereafter "the '353 patent"), the disclosures of which are hereby incorporated by reference herein in their respective entireties.

The SET process entails recording microseismic data using an array of sensors, which are typically located on the surface of the earth. Data are recorded over a given time period, with the duration of recording and the sampling interval being controlled by the objectives of the seismic data acquisition process, the characteristics of the events that generate the detected or sensed seismic energy, the distances involved, the characteristics of the subsurface, and other factors. The data recorded at each sensor location are then filtered and processed using SET processing techniques and software, which convert the data into a series of gridded subsurface volumes corresponding to multiple time samples. The values of the points in the grid represent given attributes of the data, which values vary over time as the energy emitted at each point in the subsurface varies.

What is required for effective monitoring of a fracturing operation is the ability to generate a near-real-time display of a predetermined attribute or characteristic of microseismic data, or a set of predetermined attributes or characteristics of microseismic data, that is capable of indicating the points of origin of microseismic energy in the subsurface, and the growth of a fracture network over time.

SUMMARY

In one embodiment, there is provided a method of monitoring or assessing the effectiveness of a fracking operation in a well, comprising deploying and activating an array of seismic sensors near or around a well that is to be fracked, determining at least an initial seismic or acoustic velocity model for a first volume near or around the well that is to be fracked, determining a fracking stage transmissive volume by illuminating a permeability field near or in the first volume by pumping gas or fluid into the well at pressures less than Shmin, employing near-well imaging TFI methods to process continuously or near-continuously seismic data that have been or are being acquired or recorded near the first volume, generating images corresponding to initial transmissive fractures and faults located in the first volume to determine a geometry of a pre-existing first fracture or fault network in, or in the vicinity of, the first volume that is characteristic of an initial permeability field, carrying out a first fracking stage in the well and near or in the first volume, where a suitable fluid or gas is pumped into at least the first volume at a pressure exceeding Shmin, employing near-well imaging TFI methods to process continuously or near-continuously seismic data that have been or are being acquired or recorded near the at least first volume that is being fractured in the first fracking stage, employing near-well imaging TFI methods to generate images representing fractures or faults created by the first fracking stage, and determining a second volume and geometry of a second fracture and fault network that has been created by the first fracking stage, and that is characteristic of a resulting new stage permeability field.

In another embodiment, there is provided a method of monitoring or assessing the effectiveness of a fracking operation in a well, comprising deploying and activating an array of seismic sensors near or around a well that is to be fracked, determining at least an initial seismic or acoustic velocity model for a first volume near or around the well that is to be fracked, determining a fracking stage transmissive volume by illuminating a permeability field near or in the first volume by pumping gas or fluid into the well at pressures less than Shmin, employing near-well imaging TFI methods to process continuously or near-continuously seismic data that have been or are being acquired or recorded near the first volume, generating images corresponding to initial transmissive fractures and faults located in the first volume to determine a geometry of a pre-existing first fracture or fault network in, or in the vicinity of, the first volume that is characteristic of an initial permeability field, carrying out a first fracking stage in the well and near or in the first volume, where a suitable fluid or gas is pumped into at least the first volume at a pressure less than Shmin, employing near-well imaging TFI methods to process continuously or near-continuously seismic data that have been or are being acquired or recorded near the at least first volume that is being fractured in the first fracking stage, employing near-well imaging TFI methods to generate images representing fractures or faults created by the first fracking stage, and determining a second volume and geometry of a second fracture and fault network that has been created by the first fracking stage, and that is characteristic of a resulting new stage permeability field.

Further embodiments are disclosed herein or will become apparent to those skilled in the art after having read and understood the specification and drawings hereof.

BRIEF DESCRIPTION OF THE DRAWINGS

Different aspects of the various embodiments will become apparent from the following specification, drawings and claims in which:

FIG. 4 shows one embodiment of a method 100 of processing microseismic data;

FIG. 5 shows another embodiment of a method 200 of processing microseismic data;

The drawings are not necessarily to scale. Like numbers refer to like parts or steps throughout the drawings, unless otherwise noted.

DETAILED DESCRIPTIONS OF SOME EMBODIMENTS

Figure 1:
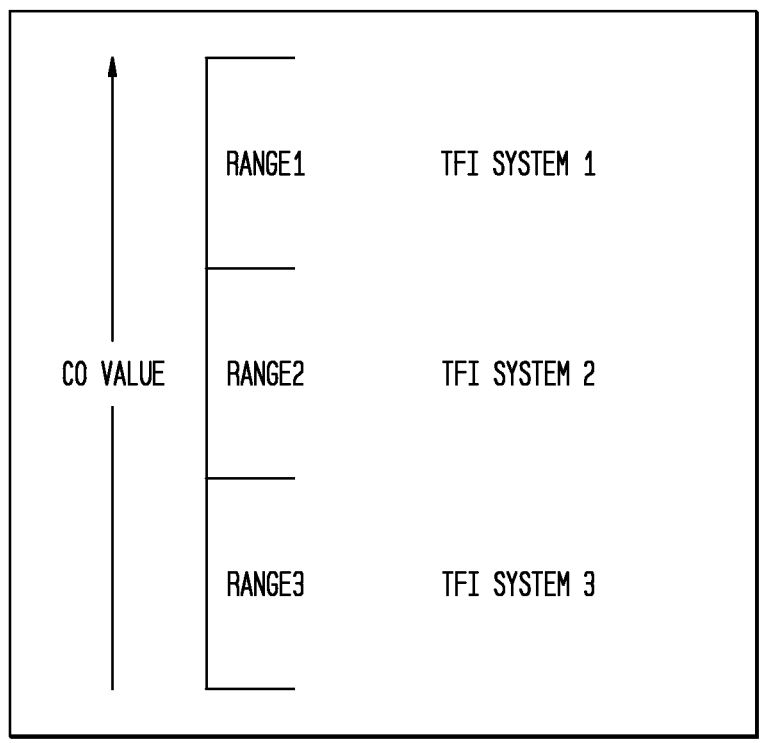
FIG. 1 shows ranges of cut-off values for different TFI systems.

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well known methods, processes and devices and systems finding application in the various embodiments described herein are not disclosed in detail.

In the drawings, some, but not all, possible embodiments are illustrated, and further may not be shown to scale.

The most ubiquitous rock structure is fracture. For example, no rocks are known to be totally devoid of joints. Because fractures scale like earthquakes, i.e., there is an inverse power law relationship between size and frequency, it may be said that there is no such thing as an "unfractured" rock, at least at some scale. Given that fractures and earthquakes are manifestations of the same phenomena, i.e. earthquakes produce fractures and vice versa, this scaling relationship is to be expected. So in a sense, to varying degrees, all reservoirs are fractured reservoirs. Thus fractures can be said to play an important and often critical role in all reservoir "architecture".

An additional fracture/fault characteristic is their heterogeneity, i.e., fracture fault systems form networks which consist of zones of very high fracture density compared to the surrounding rock. Where these zones of high fracture density are part of the permeability field, they are often referred to as fairways or zones of maximum permeability. The scale of the networks extends from millimeters to the kilometers. The relationship between fracture size and frequency indicates that because there are many orders of magnitude more smaller fractures than large ones, it is highly likely that much of the natural fracture/fault networks reside in the smaller fractures. Thus the ability to image the full spectrum of crack sizes is a requirement for direct mapping of these fracture/fault networks and in particular the fairways or "sweet spots".

Current Methods for Mapping Fracture/Fault Networks:

There currently exist at least two methods that are thought to map some aspects of fracture/fault networks; seismic attributes (coherence) and downhole micro-seismic hypocentral techniques. Neither method is capable of directly mapping the networks themselves. Coherence can indicate a number of rock attributes and is also limited by the low resolution of the image. Downhole methods provide "dots in a box" (i.e. hypocenters) and do not directly image the fracture/fault networks but rather a small number of relatively large seismic events which may be occurring in the fracture/fault zones. Further because hypocentral techniques require resolvable events, attenuation limits both the size and the distance from the sensors that resolvable events may be found.

TFI—Direct Mapping of Fracture and Fault Networks

Tomographic Fracture Imaging ("TFI") is a method that uses Seismic Emission Tomography (SET), in combination with empirical data on fracture geometry, to directly image and map both the natural fracture/fault networks and those induced by fracking. SET is a technique for identifying sources of seismic energy contained within the volume being imaged. The seismic energy is recorded by a beam forming surface array. The collected data is processed to provide a 3D grid of voxels (3D pixels) with node points at the body center of each voxel cube. The semblance value for the seismic energy associated with each voxel is calculated and assigned to its node point. The cube is color contoured for semblance.

Because the seismic data for TFI is collected by a surface array, it can be used to map the fracture/fault networks at both the scale of the treatment well/s and that of the reservoir. This allows mapping not only of the frack induced failure, but any fracture/fault fairways to which the induced fractures (and therefore the wells) are linked.

The Geological and Geophysical Basis for TFI

Methods based on empirical data for fracture geometry failure mechanisms and strength of the brittle crust are used for post-processing of the SET data in order to reveal both the natural fracture fault systems and the permeability field associated with any point in the brittle crust. These empirical data are as follows:

Fracture/fault zone geometry: Measurements and observation of fracture/fault zones show that the physical discontinuity is surrounded by a "damage" zone in which crack density increases logarithmically as the physical discontinuity is approached. The discontinuity tends to occupy the center of the zone.

Fracture/fault zone failure: The failure of any given fault or fracture surface is distributed over time and space, i.e. the entire surface does not fail at once but rather piecemeal.

Strength of the brittle crust: Over the last several decades earth stress studies have established that the earth's crust is in a near critical state, i.e. it is close to brittle failure almost everywhere. Statistical analysis of stress drop data associated with micro-seismic activity shows that small 0.01 bar) perturbations of the ambient stress field are sufficient to cause failure on critically oriented pre-existing fractures.

Critical Orientation of Hydraulically Conductive Fractures: Analysis of fluid flow in faulted rocks shows that in at least some cases the bulk of fluid transport occurs on those fractures which are critically oriented for Mohr Coulomb shear failure. In general, fractures with higher resolved shear stress are found to be more permeable, although this rule may not be universally applicable and should be determined locally.

Evidence for a fluid pressure "Wave": Rate correlation statistics can be used to show that with respect to any given injector well, wells whose production increased (a positive rate correlation) all lay within a 70°-80° sector of arc with respect to the injector, where the arc sector is bisected by the maximum horizontal compressive stress (Shmax). Thus, statistically the wells that respond positively have orientations consistent with Mohr Coulomb fracture behavior. Evidence for a solution-like fluid pressure wave may be inferred from the very rapid (hours to minutes) response of production wells to injectors at distances of up to 5 km.

The TFI Method

TFI uses the above empirical observations to operate on the "fuzzy" semblance data to extract the surfaces representing the fracture/fault networks and to distinguish between the ambient fracture/fault network and those which comprise the permeability field. Because seismic energy emission is linearly related to the sum of the area of failure over time, the regions of highest crack density will, over time, have the highest semblance value. Thus the physical discontinuity will occupy the locus of the highest semblance values accumulated over a period of time. Because the locus of highest crack density is generally located near the center of the damage zone, extraction of the central surface of the semblance cloud reveals the fracture/fault surface.

Identification of the permeability field associated with any point of increased fluid pressure is based on the evidence for a fluid pressure wave and the observation that the permeability field consists of cracks critically oriented for shear failure. A rapid change in fluid pressure results in a fluid pressure wave that moves through the permeability field. The pressure wave reduces friction on the permeable fractures. These fractures then slip because the crust is in a near critical state.

The following parameters can be used for TFI:

Voxel size: Gives the resolution of the TFI. Decreasing voxel size increases the resolution.

The voxel interpolation value n: n=1 increases resolution by 2, n=2 increases the resolution by 4, etc.

Processing window: Gives the number of traces used to calculate the semblance and is a function of sample rate.

Step up: Gives the overlap of successive windows.

Stack interval: Total amount of time over which the processing windows are summed.

Results Using TFIs

TFI can provide new information on the behavior of fractures in the brittle crust. We use the following terminology to describe this behavior.

Rock Fabric: Directions of weakness in the rock resulting from the rock history, this includes stress locked into cement, current lineations, bedding, etc. It is also known in quarries as the rock "grain".

Fracture network: A system of interconnected fractures of various orientations. A fracture network may be of any size.

Reservoir scale fracture networks: Pre-existing groups of interconnected fractures whose dimensions are measured in 100s to 1000s of meters.

Fracture Fairways: Reservoir scale fracture networks that are part of the permeability system of fluid reservoirs. The networks consist of fractures that are statistically oriented for shear with respect to Shmax.

Fracture Zones: Sets of fracture networks arrayed along some common direction to form a linear trend. The fracture networks within the zone sometimes have a similar orientation.

Induced fractures: New fractures that form in response to a human caused change in fluid pressure. From the least work principal, these fractures are controlled by the rock fabric.

Drilling damage fractures: New fractures created by drilling.

Rubblization: The new fracture systems formed by a combination of induced and drilling damage fractures.

Fracture systems vary in the following ways:

Mechanical Rock properties of the rock undergoing failure

Size of the system

New fractures vs. pre-existing

Local Stress field variation.

A consequence of the foregoing is that depending on the mix of these properties the seismic energy emitted by any given fracture system will vary. Effectively this means that the cut-off (CO) range for different fracture systems also varies. Because creating a TFI requires finding a CO range particular to a given set of fractures, those with a different CO range will not be imaged. This is illustrated in FIG. 1. Thus imaging TFI system 1 requires using a CO range of 1, TFI system 2 requires CO range 2, etc. Note that the different TFI systems do not have to be identical in either location or geometry. The complete fracture system consists of the sum of all the TFI systems.

While near well and reservoir scale activity may be linked, it may also be necessary to treat them separately as they can differ in both the scale of the fracturing and the magnitude of energy emitted. We have found that imaging the near well TFI requires using different cutoff values than that required to image the reservoir scale TFI. We interpret this to mean that the near well activity releases different amounts of seismic energy than does the reservoir scale reflecting the difference in size of the fracture networks activated at the two scales. This is consistent with the observation that the reservoir scale reflects fracturing on networks that have dimensions measured in many hundreds to many thousands of feet, whereas the near well scale consists of fracture networks measured in tens or hundreds of feet with smaller segments. As a result, the reservoir scale fracture networks sometimes emit greater amounts of seismic energy than the near well rubblization networks.

For any stage, there are two types of activity that can occur, induced fractures and activation of drilling damage fractures. Thus, identifying both types of activity is desirable. Following are methods for doing so.

Identification of Drilling Damage Fractures

According to one embodiment, we start with 1-minute sum stacks for the complete pumping time for each stage. These stacks are reduced to the voxels with the 5% highest semblance values. The remaining voxels are set to zero semblance. Next we use a Voxel Connectivity tool to identify the 1-minute sum stacks that show activity at any location along the horizontal wellbore, not only the stage being fracked. The 1-minute stacks showing activity along the wellbore are stacked to show the near-wellbore activity for the complete stage.

Method for Extracting Stage-Related Induced Fractures

One problem is to find a means of imaging only those TFIs that are associated with a given stage. There are two problems that must be solved:

Voxel Identification: Identifying those voxels which are the product of the stage activity, and Cut-Off value: Finding a CO value for this set of voxels.

Solutions to these two problems are:

Voxel Identification: We assume that the stage related TFI will be embedded in semblance clouds formed by the set of voxels which have a path of voxel connectivity that has at least one voxel which is in contact with the given stage. Error is accounted for by requiring that the contact space for deciding whether or not a given voxel is within the volume defined by the contact space. Thus if the error is n voxels, then the contact space is the set of voxels which are within n voxels of the well.

Cut-Off Value: Because the CO value will vary from stage to stage instead of defining a CO we use a top percentage of the voxels.

The ambient TFIs are those active during a period of time over which data are recorded, e.g., one hour. Longer record periods have generally been found to be unnecessary as they show little change over longer times. Pre-frack ambient data can provide a basis for interpretation of the TFI data. The information on the fracture and fault networks active prior to well treatment permits extraction of the permeability field response to the frack from that associated with the initial stress state of the field.

Figure 2:
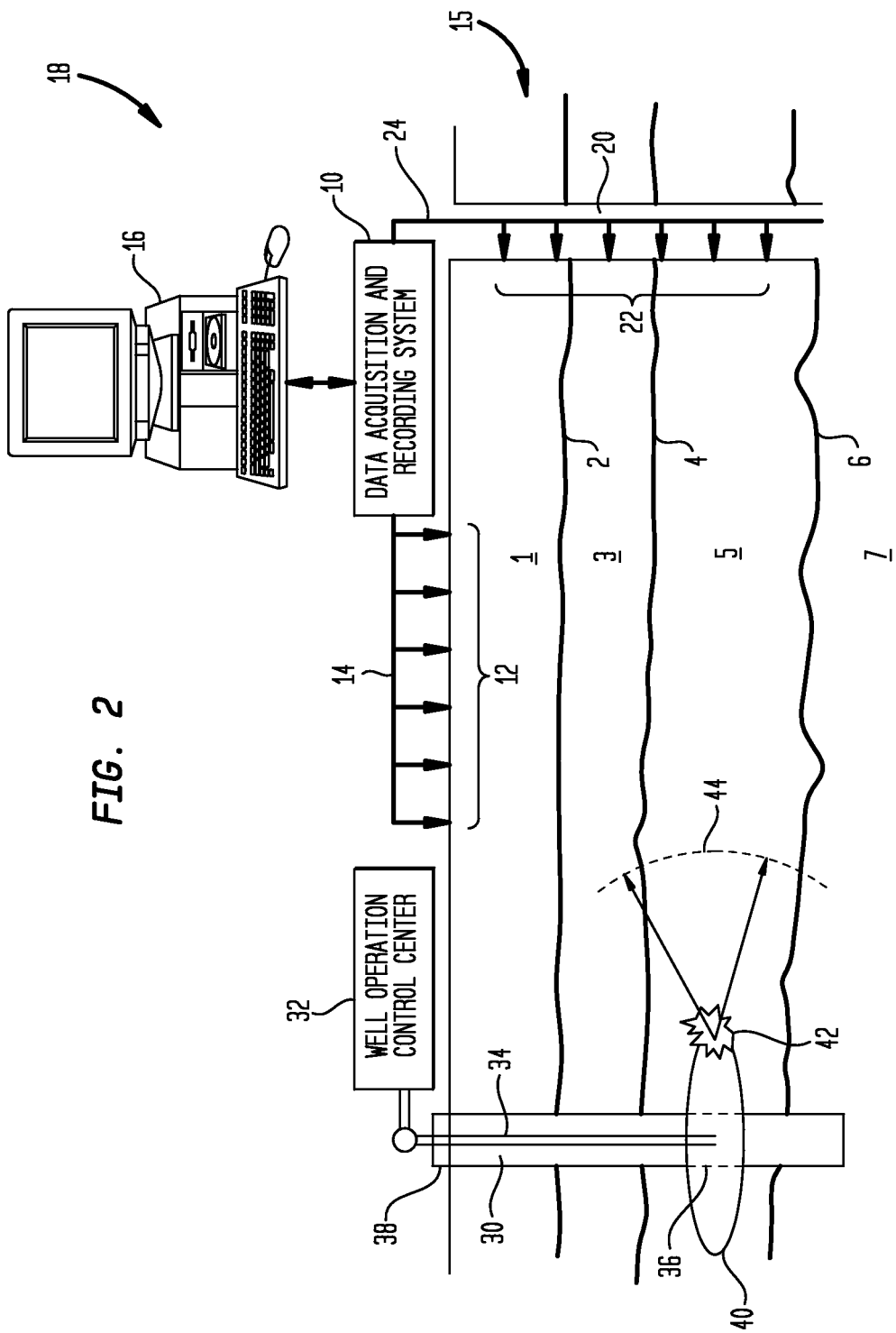
FIG. 2 shows one embodiment of a cross-sectional view of the earth and corresponding data acquisition, recording and analysis system.

FIG. 2 shows a cross-sectional view of the earth in the vicinity of well bores 20 and 30, where hydraulic fracturing fluid is injected into well bore 30 and then into geologic formation 5, and seismic wavefronts and energy 44 emitted at point of fracture 42 caused by the fracturing of geologic formation 5 by the fracturing fluid are sensed by surface sensors 12 disposed along surface 8 and/or downhole sensors 22 disposed in well bore 20. The electrical, magnetic, or optical analog or digital signals generated by sensors 12 and 22 in response to sensing seismic energy or wavefront 44 are representative of the detected or sensed seismic energy, and are recorded as data by acquisition and recording system 10. As further shown in FIG. 2, data acquisition, processing and interpretation/analysis system 18 comprises surface sensors 12 and downhole sensors 22 operably connected to data acquisition and recording system 10, and data processing computer 16 operably connected to data acquisition and recording system 10. Note that FIG. 2 shows only one of many possible embodiments of system 18 for acquiring, processing and interpreting/analyzing microseismic data in a well setting.

In FIG. 2, a fracturing operation is shown in progress in wellbore 30. Under the control and direction of well operation control center 32, hydraulic fracturing fluid is pumped into wellbore 30 at high pressure through pipe 34. The high pressure of the pumping operation forces fracturing fluid out of the wellbore 30 and through perforations 36 in wellbore 30 into hydrocarbon producing geologic formation 5. As the fracturing fluid flows outwardly from wellbore 30 and into geologic formation 5, the high pressure of the fluid fractures surrounding formation 5, causing one or more releases of seismic energy at point of fracture 42. This seismic energy propagates through subsurface 15 of the earth as a series of acoustic wavefronts or seismic waves 44, which are then sensed by surface sensors 12 and downhole sensors 22, converted into electrical, optical and/or magnetic analog or digital signals, and recorded by data acquisition and recording system 10 using techniques and equipment well known in the art. In data acquisition, processing and interpretation system 18 of FIG. 2, and according to one embodiment, data may be recorded, processed and analyzed or interpreted while fracturing is occurring, thereby permitting near-real-time monitoring of the fracturing process.

Data acquisition and processing configurations other than that shown in FIG. 2 may be employed. For example, surface sensors 12 may be employed in conjunction with downhole sensors 22, and downhole sensors may be employed in well bore 30 in addition to or instead of in well bore 20. Seismic sensors 12 and 22 may be deployed along surface 8 and in well bore 20 and/or well bore 30. Any suitable combination of surface sensors 12 and downhole sensors 22 may be employed. By way of example, sensors 12 and 22 may be geophones, accelerometers, piezoelectric sensors, hydrophones, or any other suitable acoustic sensor. One-, two- or three-axis geophones may also be used in sensors 12 on surface 8 or in sensors 22 in well bores 20 and/or 30. Sensors 22 may be cemented in place permanently in well bore 20 or well bore 30, and thereafter used to acquire data for multiple projects. Sensors 22 may also be lowered into well bore 20 on wireline or cable 24. The electrical, magnetic or optical signals from sensors 22 are then transmitted to the data acquisition and recording system 10 along through wireline or cable 24. Note further that system 18 may be employed in land, marine, off-shore rig, and transition zone settings. In addition, multiple data processing computers 16 may be employed, and/or multiple data acquisition and recording systems 10 may be employed.

Continuing to refer to FIG. 2, seismic energy 44 originating in geologic formation 5 as a result of fracturing caused by the injection of fracturing fluid into formation 5 propagates within a volume of subsurface 15 of the earth through geologic formations 1, 3, 5, and 7, and is received at a plurality of surface and/or downhole sensor locations corresponding to sensors 12 and/or 22 located proximate a volume of subsurface 15 of the earth. Each of sensors 12 or 22 may comprise one or a plurality of sensors, or arrays of sensors, and are typically geophones, although accelerometers and other types of electrical, magnetic and optical sensors may also be used. Note further that sensors 12 and/or 22 may be 1-, 2- or 3-mutually-othogonal axis sensors, geophones, hydrophones or accelerometers configured to generate electrical, magnetic and/or optical signals proportional to the displacement, velocity or acceleration of the earth at locations corresponding to sensors 12 and 22, where such displacement, velocity or acceleration is caused by seismic wavefront 44 arriving at the locations of sensors 12 and/or 22. The electrical, magnetic or optical signals generated by sensors 12 and/or 22 are transmitted to data acquisition and recording system 10 by cable 14 and wireline or cable 24.

In other embodiments, signals generated by sensors 12 and/or 22 are transmitted by wireless transmitters to a receiver operably connected to data acquisition and recording system 10. In still other embodiments, the electrical, magnetic and/or optical signals generated by sensors 12 and/or 22 are stored as data in solid state or other memory or recording devices associated with one or more sensors 12 and/or 22. The memories or recording media associated with the recording devices may be periodically collected or polled, and the data stored therein uploaded to data acquisition and recording system 10.

Other embodiments include but are not limited to, the recording of seismic waves created by the energy released by explosive charges during the perforation of wellbore 30. When wellbore 30 is cased with a metal pipe or casing, the casing must be perforated so that oil or gas may flow into pipe 34 and thence to the surface of the earth at wellhead 38. Small explosive charges are used to perforate the casing and create perforations 36 through which oil or gas may then flow. Yet further embodiments include, but are not limited to, the recording of seismic waves created by the energy released by explosive charges placed at the very bottom or "toe" of a well, or by a "string shot" (generated by a cord-like length of explosive material placed within the well), both of which techniques are typically carried out for the purpose of developing a seismic velocity depth profile of the well.

Still other configurations and embodiments may be employed to locate, measure and analyze faults in the subsurface of the earth by microseismic detection and processing means, such as, for example, sensing, recording and analyzing seismic energy originating from naturally occurring events, such as slippage along faults, settling or tilting of the subsurface, earthquakes, and other naturally-occurring events.

Data recorded by data acquisition and recording system 10 is typically, although not necessarily, in the form of digitally sampled time series referred to as seismic traces, with one time series or seismic trace for each sensor 12 or 22. Each value in the time series is recorded at a known time and represents the value of the seismic energy sensed by sensors 12 and 22 at that time. The data are recorded over a period of time referred to as the data acquisition time period. The data acquisition time period varies depending on the objective of the seismic survey. When the objective of the survey is to monitor a fracturing operation, for example, the data acquisition time period may be in hours or even days. When the objective of the survey is to acquire data associated with perforating a well, the data acquisition time period is much shorter and may be measured, by way of example, in seconds or minutes.

The rate at which data are recorded for each of the channels corresponding to each of the sensors 12 and 22 may also be varied in accordance with the objectives of the survey, and the frequencies characteristic of the seismic energy generated at point of fracture 42, and seismic wavefront 44 as it propagates through subsurface 15 and to surface 8. For example, if frequencies less than or equal to 125 Hz are expected to be sensed or measured in acoustic wavefront 44, data may be sampled at a rate of 2.0 milliseconds ("ms") per channel to ensure aliasing does not occur. Other sample rates are also possible such as 0.25 ms, 0.5 ms, 1 ms, 4 ms, 8 ms, 16 ms, and so on.

It is usual to record more data than is required for a given survey objective. For example, when monitoring a fracturing operation, recording may begin several minutes before the fracturing operation is scheduled and continue until a time beyond which it is unlikely that any further energy will be released as a result of the fracturing process. Such a process may be used to record the ambient seismic field before and/or after fracturing, production, halt of production, or perforation operations, more about which is said below. To restrict the data processing to cover only a time of interest, a skeletonization time period is selected from within the data acquisition time period, and only data recorded within the skeletonization time period are processed.

Once the seismic data have been recorded, they must be processed and converted to produce a useful display of information. Examples of providing such displays of information may be found in the above-referenced '361 and '353 patents, where some SET data acquisition and processing techniques are described in detail.

In at least some SET techniques and processes, and as described above, the subsurface of the earth is subdivided into a 3D grid, and the cells in the grid are referred to as 'voxels'. A 'voxel' or 'volume element' is the 3D equivalent of a 2D 'pixel' or 'picture element'. While various different algorithms may be used to transform the acquired data, the end result is typically the same: a series of SET spatial volumes are produced, where each SET spatial volume is associated with a given data subset, and each data subset corresponds to a given time window. The values corresponding to the voxels within the spatial volume represent the amount of energy emitted from each voxel during a given time window.

The energy emitted from each voxel during a given time window may be represented by different attributes of the data, including, but not limited to, semblance, amplitude, absolute amplitude, reflection strength (the amplitude of the envelope of the seismic wave), phase, frequency, and other attributes of seismic data which will be apparent to those skilled in the art. According to one embodiment, more about which is said below, voxel values are computed on the basis of semblance values.

In one embodiment, the voxel values within SET spatial volumes are filtered. In such a context, "filtering" or "voxel filtering" means sorting, restricting or limiting the voxel values which are employed in subsequent steps, and may not mean changing the value of any voxel by applying filters to individual data values. In such an embodiment, the objective is to improve the final result by only including data values corresponding to releases of seismic energy from a fault or fracture, while eliminating data values that are likely to correspond to random noise spikes or low level background noise. There are many ways of selecting voxel value limits or "voxel filtering," and the embodiments set forth herein for doing so are merely provided as examples of some techniques that may be used. It is to be understood, however, that other "voxel filtering" techniques may be used, including techniques where individual voxel values are filtered, or where voxel values are smoothed, averaged, median-filtered, and the like.

Referring now to FIGS. 3(*a*) through 4, there are illustrated several different aspects of various embodiments of imaging the space or volume near or around a well. According to one such embodiment, and with particular reference to FIG. 4, there is provided a method 100 of imaging at least one of a fracture and fault generated in the subsurface of the earth near a well bore during a hydraulic fracturing stage, the hydraulic fracturing stage being carried out in the well bore at a hydraulic fracturing stage location during a hydraulic fracturing stage time period, the method employing a seismic emission tomography (SET) data set acquired over a data acquisition time period, the SET data set being acquired with a plurality of sensors located at a plurality of sensor positions disposed in proximity to the well, where the method comprises at step 102 selecting a first sub-set of SET data from the SET data set corresponding to a reduced temporal distribution with respect to the SET data set and to at least portions of hydraulic fracturing stage time period, the first sub-set of SET data further corresponding to a first set of nodes or voxels.

In step 102 of FIG. 4, all relevant space and a relevant subset in time are selected, as represented in FIG. 3(*a*) by volume 70 penetrated by well 20 having initial fracture location 40. Sensors or geophones 14 and 24 are disposed near and/or around well 20 and/or 30. At step 104, a first sub-set of SET data from the SET data set is selected corresponding to a reduced temporal distribution with respect to the SET data set and to at least portions of hydraulic fracturing stage time period, the first sub-set of SET data further corresponding to a first set of nodes or voxels. That is, all of the space or volume selected in step 102 is retained, while a subset of the original time is now selected, as represented by FIG. 3(*b*). In step 104, FFIDs are identified for the stage. When selecting hypocenters the stage interval includes the time from the start of pumping the stage to the start of pumping the next stage. For TFI generation the stage is defined differently as the time from start of pumping to the end of pumping. In step 104, the raw semblance data may be stacked in into 1-minute volumes. Volume 70 in FIG. 3(*b*) corresponding to step 104 is a volume representing the first subset. This subset comprises a collection of independent volumes that have the same location, and the same number of voxels, but different times. These can be referred to as different time sub-intervals.

At step 104, the first sub-set of SET data is processed to generate a second voxel-value-filtered sub-set of data corresponding to a second set of nodes or voxels in the subsurface having a reduced spatial distribution with respect to the first sub-set of SET data set, as further represented by FIG. 2(*c*), where correspondingly reduced volumes 72, 74, 76 and 78 are shown, which correspond to the second subset. The image shown in FIG. 3(*c*) represents all time, but only voxels that meet selected amplitude or other criteria. Therefore the space is no longer filled. Volumes 72, 74, 76 and 78 represent all time of the first subset. There is the possibility that all voxels could be filled, but this is not generally the case. This can occur because the amplitude or other criteria are applied independently to each sub-interval. In step 106, a top percentage of the number of voxels in each 1-minute volume (based on highest amplitude voxels, for example) for all semblances corresponding to the stage are selected. Step 104 is generally iterated for all stages in order to select a single percentage that is applicable to all stages. Such a percentage, e.g., the top 5% of voxels with the highest semblance values, is applied to each FFID using percentage filter techniques. For each FFID, all voxels which are less than the selected percent become inactive.

Next, at step 106, the second sub-set of data is processed to generate a third voxel-value-filtered sub-set of data corresponding to a third set of nodes or voxels in the subsurface having a reduced spatial and temporal distribution with respect to the second sub-set of data, the reduced spatial and temporal distribution of the third voxel-value-filtered sub-set of data being selected on the basis of nodes or voxels in the third set known or determined to be near the hydraulic fracturing stage location and time intervals corresponding thereto. See FIG. 3(d), where only volume 72 remains. A software connectivity tool can be used to determine if voxels for each FFID which has passed the percentage filter are connected to the stage. In step 106, all FFIDs with unconnected voxels are removed. The percentage of FFIDs removed varies greatly from project to project and within a project, from stage to stage. The remaining FFIDs have clouds of voxels where each voxel has passed the percentage and connectivity filters.

Figure 3A:
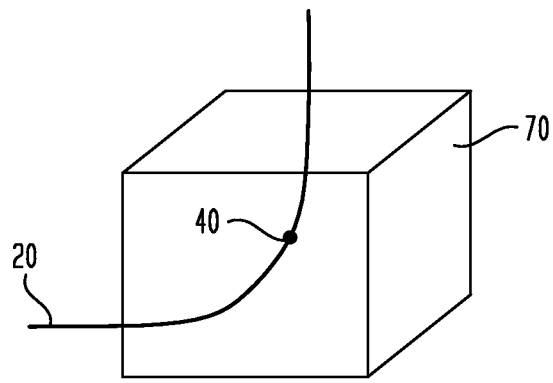
FIGS. 3(a) through 3(f) illustrate various stages of the methods shown in FIGS. 4 through 8.
Figure 3B:
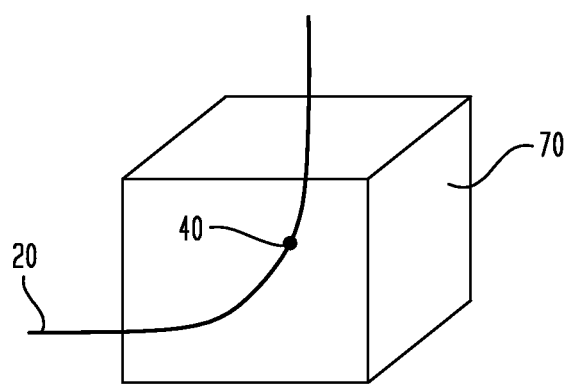
Figure 3C:
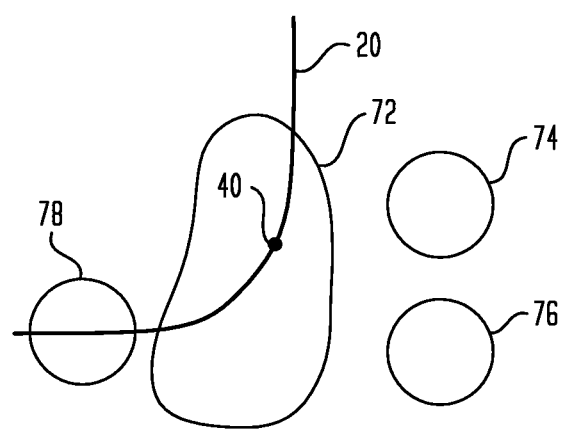
Figure 3D:
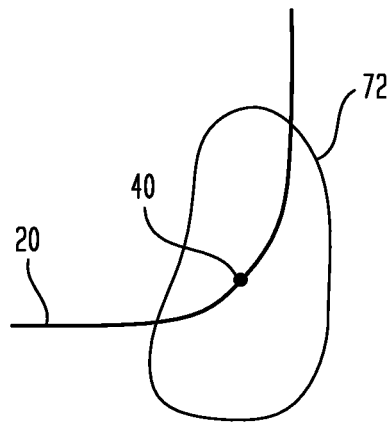
Figure 3E:
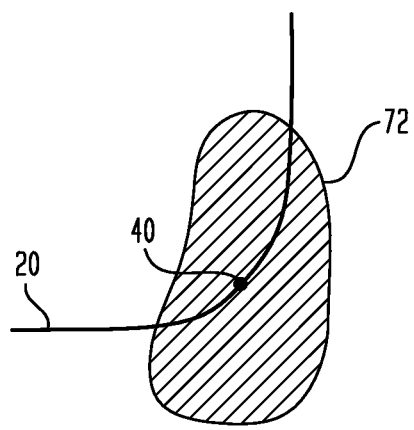

At step 108, the third sub-set of data is processed to generate a fourth sub-set of data corresponding to combining or stacking data across time intervals in the third voxel-value-filtered sub-set of data to form stacked filtered voxel values in the third set of nodes or voxels. The forth subset is a combination of the sub-intervals shown in FIG. 3(e), and represents a cloud of data, or a summation of all times that meet predetermined criteria. Thus, there are no longer any separate time sub-intervals. During step 108, all filtered FFIDs can be stacked or otherwise combined to yield a single cloud 72, as shown in FIG. 3(e). Sometimes cloud 72 of FIG. 3(e) still contains background level voxels. In this case cloud 72 must be further clamped, sometimes using a transect software tool. This step is sometimes applied to the cloud, or alternatively applied as a final step after the TFI has been generated. The cloud is nearly always stretched in the Z direction. An estimate of the percent stretching that has occurred may be applied a tool (most recently a cosine taper tool) to remove the stretch.

Figure 3F:
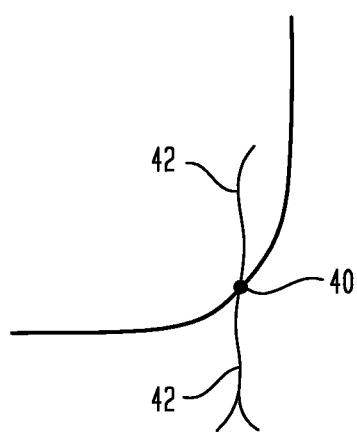

Finally, at step 110 (see FIG. 3(f)), the stacked filtered voxel values of the fourth sub-set of data are skeletonized to generate a fifth sub-set of data corresponding to a three-dimensional spatial representation of fractures or faults 42. At step 110, volume 72 of FIG. 3(e) has been reduced to the internal surfaces shown in FIG. 3(f). Sometimes undesired small, free-floating portions of cloud 72 remain after step 110, in which case they may be removed by reapplying the connectivity tool. This is simply a way to remove small extraneous segments that are not connected to the main TFI. Stretching corrections or algorithms may also be applied during step 110.

With respect to the flow charts and methods set forth in FIGS. 5 through 8 (discussed in greater detail below), and for the purpose of providing clarification, we now provide further information and explanation concerning the meanings of some of the terms appearing in these Figures.

Data acquisition time period means the period of time ranging, by way of example, from about one minute to about one week or more during which time period microseismic data are recorded. The data acquisition time period is selected to be longer than, and to encompass within it, the time period over which fracturing or other events of interest occur.

Skeletonization time period means a subset of the data acquisition time period, and is selected in accordance with data processing parameters and objectives specific to the particular task at hand (e.g., determining and displaying as a function of time points of fracture origin corresponding to a fracking operation). By way of example, the skeletonization time period may range between one minute and several hours (e.g., the time period of interest over which the fracturing or other events of interest take place).

The time window is a subset of the skeletonization time period, and defines a length of time over which data are processed to generate a single SET spatial volume, which by way of example may range between about 0.1 seconds and several minutes. In one embodiment, the skeletonization time period is subdivided into a plurality of time windows of equal length, and the time increment for the start time of each time window may be selected to be less than or equal to the time window length, thereby causing adjacent time windows to overlap. In another embodiment, such time windows do not overlap. Processing microseismic data falling within the skeletonization time period using SET data processing techniques results in a plurality of SET spatial volumes, where each SET spatial volume represents a given time window, and where the plurality of SET spatial volumes represents a series of concatenated or sequentially arranged time windows.

The time interval is a subset of the skeletonization time period comprising a plurality of time windows. Data from each time interval is filtered and stacked, or stacked and filtered, as the case may be, and as further described below, to create a skeletonized output spatial volume that shows the fractures as they existed at the time corresponding to each time interval. Displaying the skeletonized output spatial volumes from consecutive time intervals illustrates the growth of the fractures with time over the entire skeletonization time period. By way of example, each time interval may range between about 1 second and several hours.

A time lapse file is a file stored in the data acquisition, recording and analysis system 18 shown in FIG. 2, or stored in another computer-readable medium such as a hard drive, optical drive, flash drive or the like, where the values of each such file represent filtered voxel values corresponding to a given time window within a given time interval.

A time interval file is a file stored in the data acquisition, recording and analysis system 18 shown in FIG. 2, or stored in another computer-readable medium such as a hard drive, optical drive, flash drive or the like, where the values of each such file represent stacked voxel values corresponding to a given time interval.

"Skelfile" is shorthand for "skeletonized file," or a file containing the skeletonized results for a single time interval showing a composite of the fractures or faults that have been detected over the time interval corresponding thereto.

"Time sequence skelfile" is a file containing the skeletonized results for all time intervals, which file is output only when the skeletonization time period has been subdivided into a plurality of time intervals, and which shows the growth of the detected fractures or faults over time.

Referring now to FIG. 5, there is shown one embodiment of a method 200 for imaging one of a fracture and a fault in an earth volume disposed beneath a surface of the earth using a microseismic seismic emission tomography (SET) data set acquired over a data acquisition time period using a plurality of sensors located at a plurality of sensor positions disposed proximate the earth volume. As shown in FIG. 5, at step 202 a skeletonization time period within the data acquisition time period is selected. At step 204 the skeletonization time period is sub-divided into a series of time windows using a time increment. At step 206 an input data set corresponding to the skeletonization time period is generated, where the input data set comprises a plurality of data subsets, each data subset corresponding to a given time window. At step 208 the input data set is transformed into a plurality of SET spatial volumes, where each SET spatial volume is associated with a given data subset and has a plurality of voxels associated therewith. Next, at step 210 each data subset is voxel value temporally and spatially filtered to generate filtered voxel values associated therewith, and at step 212, after voxel value filtering, at least selected ones of the filtered voxel values are stacked to generate stacked filtered voxel values. Finally, at step 214 the stacked filtered voxel values are skeletonized to generate a three-dimensional spatial representation of the fracture or fault. Note that according to one embodiment semblance filtering techniques may be applied at step 210, and further that the order of some of the steps shown in the FIG. 5 may be changed as those skilled in the art will understand.

Some additional steps that may be included in some embodiments of method 200 of FIG. 5 include one or more of: (a) voxel value filtering further comprising computing at least one local maximum in the voxels of the data subset; (b) voxel value filtering further comprising passing voxel values that exceed a predetermined minimum value; (c) voxel value filtering further comprising filtering each data subset to pass a predetermined percentage of the highest voxel values associated therewith; (d) voxel value filtering further comprising filtering each data subset to pass voxel values that exceed a calculated value computed on the basis of a range of values in the data subset; (e) stacking further comprising computing the cumulative sum of the filtered voxel values; (f) stacking further comprising computing the maximum value of the filtered voxel values; (g) stacking further comprising computing the average of the filtered voxel values; (h) having voxel values in SET spatial volumes correspond to semblance values; (i) acquiring the microseismic SET data set; (k) disposing at least some of the plurality of sensors along the surface of the earth; (l) disposing at least some of the plurality of sensors beneath the surface of the earth in a borehole or well bore; (m) selecting the data acquisition time period to range between about 1 minute and about one week; (n) acquiring the microseismic SET data set under ambient microseismic energy conditions; (o) selecting the skeletonization time period to correspond approximately to a time period over one of which hydraulic fracturing, casing perforation, string shot, and toe shot operations occur; (p) selecting the skeletonization time period to correspond approximately to a time period over one of which oil production is initiated and gas production is initiated; (q) selecting the skeletonization time period to correspond approximately to a time period over one of which oil production is occurring and gas production is occurring; (r) selecting the skeletonization time period to correspond approximately to a time period over one of which oil production is terminated and gas production is terminated; (s) selecting the skeletonization time period to correspond approximately to a time period over one of which oil production is reduced and gas production is reduced; (t) selecting the skeletonization time period to correspond approximately to a time period over which an ambient microseismic energy field is recorded; (u) voxel value filtering further comprising one of semblance filtering, median filtering, threshold filtering, 2-D filtering, 3-D filtering, coherence filtering, statistical filtering, deconvolution, random noise filtering, static and/or dynamic time shifting and correction, muting, and coherent noise rejection; (v) selecting the time window to range between about 0.1 seconds and about 1 hour; and (w) selecting the time increment to range between about 0.1 seconds and about one hour. Note that the time increment is generally less than or equal to the time window.

Figure 6:
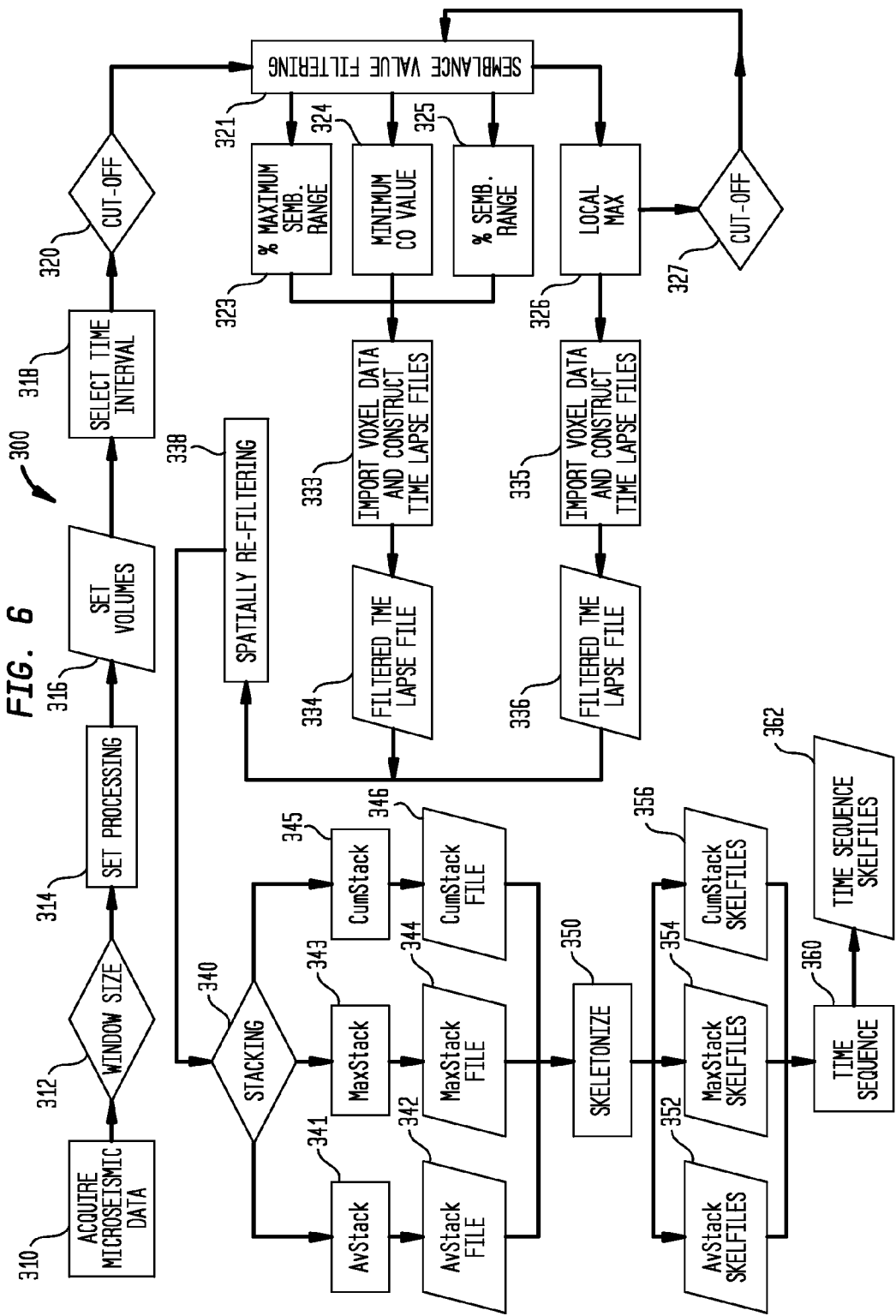
FIG. 6 shows still another embodiment of a method 300 of processing microseismic data.

In FIG. 6, method 300 begins at step 310 where microseismic data are acquired over the data acquisition time period. At step 312, a window size for the acquired microseismic data is selected. By window size in step 312 we mean that: (a) a skeletonization time period is selected, which is shorter than the data acquisition time period, and (b) time windows for SET volumes are selected. By way of example, in a fracking operation, the skeletonization time period may range between several minutes and several hours, and in a casing perforation operation may range between several seconds and several minutes. Further by way of example, time windows for SET volumes typically range between about 0.1 seconds and several minutes depending on the particular application at hand. By way of yet further example, in fracking operations the time windows may range between about 10 seconds and several minutes, and in casing perforation operations the time windows may range between about 1 second and about 10 seconds. Additionally, the SET volumes (or "study volumes") may correspond, again by way of example only, to spatial volumes ranging between about 0.1 km$^3$ and about 5,000 km$^3$. Other values or ranges for the data acquisition time period, time windows, the skeletonization time period, SET volumes not explicitly set forth herein are of course contemplated.

Continuing to refer to FIG. 6, at step 314, and after the skeletonization time period and time windows have been selected, SET volumes corresponding to each of the time windows are generated, where each SET volume contains one or more voxels of microseismic data corresponding thereto. SET volume data files are produced at step 316 on the basis of step 314. At step 318 time intervals are selected, as discussed in some detail above. For example, if a skeletonization time period of one hour is selected at step 312, and time windows having a length of one minute each are selected at step 312, the time interval selected in step 318 might be 6 minutes so as to produce a total of ten time intervals corresponding to the one hour skeletonization time period. Each time interval of six minutes can then be used in subsequent processing steps to produce 10 skeletonization time sequence skelfiles displaying, for example, the progressive growth of the faults or fractures in the formation over time, more about which is said below.

Still referring to FIG. 6, at step 321 a decision is made as which cut-off filtering option from among steps 323, 324, 325 and 326 is to be employed in the next stage of processing (i.e., the percent of the number of voxels at step 323, minimum cut-off value at step 324, percent semblance range 325 at step 325, and local maximum at step 326). Note that trial and error in finding an optional one of these cut-off filtering methodologies may be required.

Referring to step 325 in FIG. 6, according to one embodiment a method of voxel value filtering is to specify which percentage of the voxel values is selected. For example, if this criterion is set to select 10% of the voxels, then the voxels with the top 10% of the voxel values for a given SET spatial volume are passed through to the next step. The values of the attributes represented by the data set can vary considerably from one SET spatial volume to another, but this option ignores the variation and passes the specified percentage of voxels, which means that each SET spatial volume contributes the same number of voxels to the end result, but not necessarily at the same grid positions.

As further shown in step 324 in FIG. 6, another method of voxel value filtering is to generate a minimum voxel value. Only voxel values greater than this cut-off value are passed on to the next step. Different SET spatial volumes may contribute different numbers of voxels to the final result, depending on the range of voxel values within the SET spatial volume, and each SET spatial volume may contribute a different subset of voxels. Any SET spatial volume that does not have at least one value above the minimum value is not passed through to the following steps.

As also shown in FIG. 6 at step 323, another method of voxel filtering is to use a percentage of the range of values. First, for a given SET spatial volume the range of values from lowest to highest is determined. Then a percentage factor is applied to this range, so that the cut-off is set at some numerical value corresponding to that percentage of the range. For example, if the values vary between 0.1 and 0.5, the range is 0.4, and the selected percentage is 20%, then 20% of the range is 0.08. Only voxels with values exceeding (0.5-0.08) or 0.42 are passed through to the next step. Some SET spatial volumes have many voxels with high values, and some have very few, so the number of voxels contributed by each SET spatial volume can be expected to vary widely. The contributing voxels are not necessarily in the same grid position in the subsurface from one SET spatial volume to the next.

As additionally shown in FIG. 6 at step 326, another method of restricting the data to improve the quality of the final result is to use a local maximum algorithm. The previously described methods of voxel filtering may pass clusters of the highest values, at the expense of other significant but slightly lower values. For example, the top 10% of semblance values may all belong to one large release of seismic energy, but there may be other values corresponding to different events in the subsurface of the earth, which are omitted. In one embodiment of the local maximum algorithm, all voxels having a neighboring voxel with higher amplitude are discarded, leaving only isolated values representing the high point of each of multiple events. Only these isolated values are passed through to the next step. Other embodiments using different algorithms to define local maximum values will become apparent to those skilled in the art. In an additional embodiment, after the local maximum algorithm has been applied, the results are filtered using a cut-off filtering option from among steps 323, 324, 325, (i.e., the percent of the number of voxels at step 323, minimum cut-off value at step 324, percent semblance range at step 325). The processing parameters used in this additional filtering step are computed from the values contained within the local maximum algorithm output data.

A further method of conditioning data by excluding certain data points is to specify an upper boundary for the voxel values. This technique may be used to modify anomalous or highly skewed data where the results might otherwise be distorted by a small number of values with amplitudes greatly exceeding the norm. This technique may be used alone or in conjunction with the previously described techniques for limiting the data values passed to the next step.

Continuing to refer to FIG. 6, once the appropriate cut-off filtering option has been selected at step 321, and the selected semblance filtering option has been carried out, voxel file data are imported at step 333 or step 335 into a time lapse file, and a filtered time lapse file is created at step 334 or step 336, followed by spatially re-filtering such data at step 338. The filtered time lapse file is then forwarded to stacking step 340, where a decision is made as to which of stacking methodologies 341 (average stack or "AvStack), 343 (maximum stack or "MaxStack") or 345 (cumulative stack or "CumStack) is to be employed.

Continuing to refer to FIG. 6, steps 341, 343, and 345 are followed by generating one of average stack (AvStack) data files at step 342, maximum stacking (MaxStack) data files at step 344, or cumulative stack (CumStack) data files at step 346, depending on the type of stacking that has been selected after stacking step 340, and the output data file is forwarded to step 350, where the file is "skeletonized."

One method of skeletonization using a thinning algorithm is described in Directional 3D Thinning Using 8 Subiterations, Kálmán Palágyi and Attila Kuba, DGCI'99, LNCS 1568, 325-336 (1999), the disclosure of which is incorporated herein in its entirety. Illustrations of a simple form of skeletonization are shown in "Direct Mapping of Reservoir Permeability Fields", Peter Geiser, Jan Vermilye, Rob Scammell and Steve Roecker, Oil & Gas Journal, December 2006. This article discloses 2-D skeletonization slices taken through a 3-D SET volume. Some aspects of the teachings of these references may be adapted and modified for use in the skeletonization process at step 350 of FIG. 6. Further details and descriptions of some embodiments of such skeletonization techniques are further described below.

The skeletonized data from step 350 are next employed to generate one of an AvStack skelfile at step 352, a MaxStack skelfile at step 354, or a CumStack skelfile at step 356. The appropriate skelfile output corresponding to the single given time interval is then taken at step 360 and placed in its appropriate location in a time sequence, followed at step 362 by being placed within a sequence of other previously or subsequently calculated skelfiles to create a graphical sequence of 3-D skeletonization images that reveal the progress of the faults or fractures generated by the well procedure or subsurface event that has been monitored (e.g., fracking or perforation). In another embodiment the sequence of skelfiles may be combined into one display with the data values color coded based on the time stamp associated with the time interval associated with each of the sequence of skelfiles.

Each one of the SET spatial volumes, or windows, represents a snapshot in time of the energy being emitted from the fractures or faults within a volume of the subsurface. One objective of this method is to show the growth of a fracture, or the movement of a fault, as it develops over time. This is done by taking more than one of the SET spatial volumes and stacking the values at corresponding voxels to produce one SET spatial volume representing an attribute of the seismic energy released over the total time of the combined windows. Each member of the series of the more than one of the SET spatial volumes has an assigned time stamp marking the time when the data in the volume was recorded. The series of the more than one of the SET spatial volumes ordered by the assigned time stamp is a "time lapse volume". The time lapse volume may cover the entire skeletonization time period, or the skeletonization time period may be divided into a plurality of time lapse volumes which are stacked individually and the results displayed as a time sequence showing the growth of the fractures. The techniques described herein for accomplishing this stacking process are examples of possible embodiments, and many other techniques will become apparent to those skilled in the art upon having read and understood the present disclosure.

Figure 7:
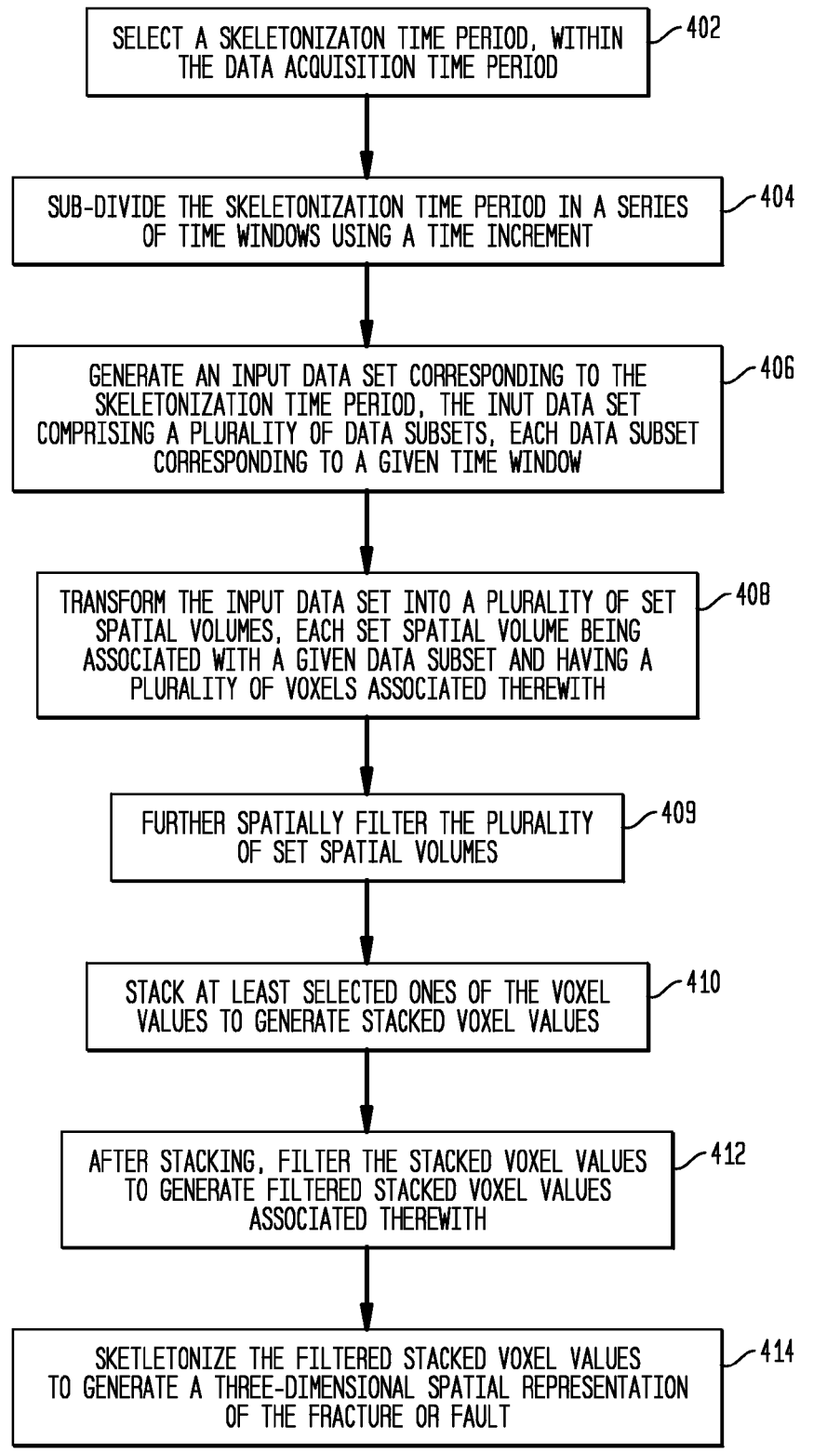
FIG. 7 shows yet another embodiment of a method 400 of processing microseismic data.

Referring now to FIG. 7, there is shown one embodiment of another method 400 for imaging one of a fracture and a fault in an earth volume disposed beneath a surface of the earth using a microseismic seismic emission tomography (SET) data set acquired over a data acquisition time period using a plurality of sensors located at a plurality of sensor positions disposed proximate the earth volume. As shown in FIG. 7, at step 402 a skeletonization time period within the data acquisition time period is selected. At step 404 the skeletonization time period is sub-divided into a series of time windows using a time increment. At step 406 an input data set corresponding to the skeletonization time period is generated, where the input data set comprises a plurality of data subsets, each data subset corresponding to a given time window. At step 408 the input data set is transformed into a plurality of SET spatial volumes, where each SET spatial volume is associated with a given data subset and has a plurality of voxels associated therewith. At step 409, the plurality of SET spatial volumes is further spatially filtered. Next, at step 410 selected ones of the voxel values are stacked to generate stacked voxel values. After stacking, at step 412, the stacked voxel values are used to generate filtered stacked voxel values associated therewith. Finally, at step 414 the filtered stacked voxel values are skeletonized to generate a three-dimensional spatial representation of the fracture or fault. Some additional steps that may be included in some embodiments of method 400 of FIG. 4 include, but are not limited to, those described above with respect to FIG. 5.

Figure 8:
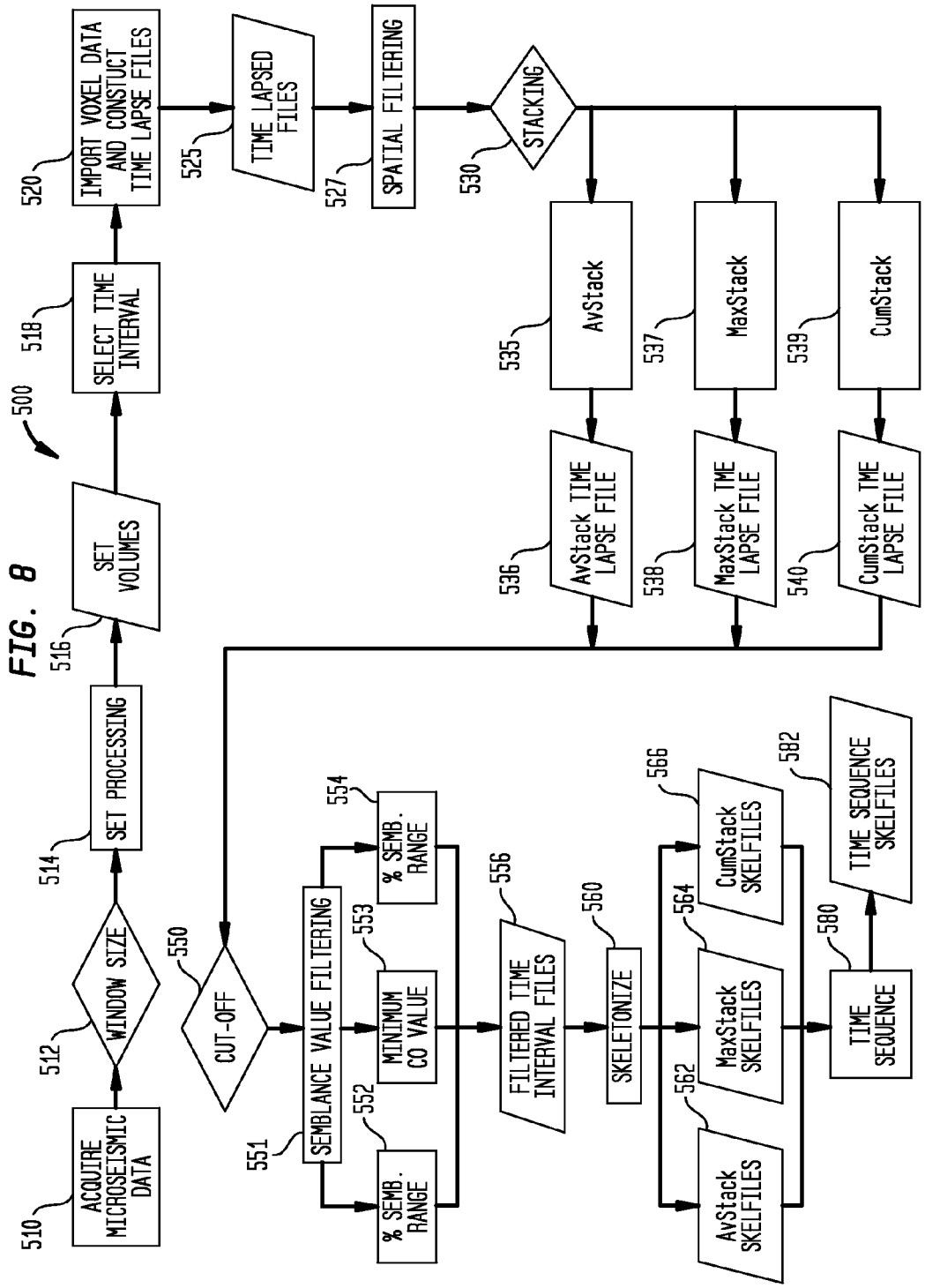
FIG. 8 shows another embodiment of a method 500 of processing microseismic data.

Referring now to FIG. 8, there is shown one embodiment of method 500 corresponding to method 400 of FIG. 7, where method 500 shows further details concerning some of the steps of method 400 according to one embodiment. In FIG. 8, method 500 begins at step 510 where microseismic data are acquired. At step 512, a window size for the acquired microseismic data is selected. By window size in FIG. 8 we mean a skeletonization time period is selected, which is shorter than the data acquisition time period, and time windows for SET volumes are selected. By way of example, in a fracking operation, the skeletonization time period may range between several minutes and several hours, and in a casing perforation operation may range between several seconds and several minutes. Further by way of example, time windows for SET volumes typically range between about 0.1 seconds and several minutes depending on the particular application at hand. By way of yet further example, in fracking operations the time windows may range between about 10 seconds and several minutes, and in casing perforation operations the time windows may range between about 1 second and about 10 seconds. Additionally, the SET volumes (or "study volumes") may correspond, again by way of example only, to spatial volumes ranging between about 0.1 $km^3$ and about 5,000 $km^3$. Other values or ranges for the data acquisition time period, time windows, the skeletonization time period, SET volumes not explicitly set forth herein are of course contemplated Continuing to refer to FIG. 8, at step 514, and after the skeletonization time period and time windows have been selected, SET volumes corresponding to each of the time windows are generated, where each SET volume contains one or more voxels of microseismic data corresponding thereto. SET volume data files are produced at step 516 on the basis of step 514. At step 518 time intervals are selected, as discussed in some detail above. For example, if a skeletonization time period of one hour is selected at step 512, and time windows having a length of one minute each are selected at step 512, the time interval selected in step 518 might be 6 minutes so as to produce a total of ten time intervals corresponding to the one hour skeletonization time period. Each time interval of six minutes can then be used in subsequent processing steps to produce 10 skeletonization time sequence skelfiles displaying, for example, the progressive growth of the faults or fractures in formation 5 over time, more about which is said below.

At step 520, voxel data time lapse files are created and the voxel file data imported into the voxel data time lapse files At step 525, a time lapse file I generated that contains the SET processed voxel data for the subset of time windows contained within a time interval. At step 527, data from step 525 are spatially filtered.

Still referring to FIG. 8, at step 530, a stacking option is selected, which according to one embodiment may include one or more of average stacking (AvStack), maximum stacking (MaxStack), and cumulative stacking (CumStack) steps 535, 537 and 539, respectively. Steps 535, 537, and 539 generate, respectively, one of average stack (AvStack) time lapse files at step 535, maximum stacking (MaxStack) time lapse files at step 537, or cumulative stack (CumStack) time lapse files at step 540, depending on the type of stacking that has been selected after at stacking option selection step 530.

The output time lapse files from steps 535, 537 or 539 are provided to step 550, where the values are next directed to one semblance value filtering steps percent semblance range 552, minimum CO value step 553 and percent of voxels 554.

Referring to step 554 in FIG. 8, according to one embodiment a method of voxel value filtering is to specify what percentage of the voxel values will be chosen. For example, if this criterion is set to select 10% of the voxels, then the voxels with the top 10% of the voxel values for a given SET spatial volume will be passed through to the next step. The values of the attributes represented by the data set can vary considerably from one SET spatial volume to another, but this option ignores the variation and passes the specified percentage of voxels, which means that each SET spatial volume will contribute the same number of voxels to the end result, but not necessarily at the same grid positions.

As further shown in step 553 in FIG. 8, another method of voxel value filtering is to generate a minimum voxel value. Only voxel values greater than this cut-off value are passed on to the next step. Different SET spatial volumes may contribute different numbers of voxels to the final result, depending on the range of voxel values within the SET spatial volume, and each SET spatial volume may contribute a different subset of voxels. Any SET spatial volume which does not have at least one value above the minimum value will not be passed through to the following steps.

As also shown in FIG. 8 at step 552, another method of voxel filtering is to use a percentage of the range of values. First, for a given SET spatial volume the range of values from lowest to highest is determined. Then a percentage factor is applied to this range, so that the cut-off is set at some numerical value corresponding to that percentage of the range. For example, if the values vary between 0.1 and 0.5, the range is 0.4, and the selected percentage is 20%, then 20% of the range is 0.08. Only voxels with values exceeding (0.5-0.08) or 0.42 will be passed through to the next step. Some SET spatial volume will have many voxels with high values, some will have very few, so the number of voxels contributed by each SET spatial volume will vary widely. The contributing voxels will not necessarily be in the same grid position in the subsurface from one SET spatial volume to the next.

Filtered time interval files 556 are output from the filtering process selected at 550. At this point in the data processing flow, time sequences are generated at step 580, and the skeletonization process 560 generates time sequence skeletonization files at step 562 (Avstack skelfile), 564 (Maxstack skelfile) or 566 (CumStack skelfile) depending on which methodology was selected in the stacking process at 530. whereupon a 3-D representation of the skeletonized fracture or fault is finally produced.

One method of generating the time sequence skeletonization files, using a thinning algorithm, is described in Directional 3D Thinning Using 8 Subiterations, Kálmán Palágyi and Attila Kuba, DGCI'99, LNCS 1568, 325-336 (1999). Illustrations of a simple form of skeletonization are shown in "Direct Mapping of Reservoir Permeability Fields", Peter Geiser, Jan Vermilye, Rob Scammell and Steve Roecker, Oil & Gas Journal, December 2006 the disclosure of which is incorporated herein in its entirety. Some aspects of these references may be applied to the skeletonization process of FIG. 7. at 560. Further details and descriptions of some embodiments of the skeletonization step are described below.

The skeletonized data from step 560 may next be employed to generate one of an AvStack skelfile at step 562, a MaxStack skelfile at step 564, or a CumStack skelfile at step 566. The appropriate skelfile output corresponding to the single given time interval is then taken at step 580 and placed in its appropriate location in a time sequence, followed at step 582 by being placed within a sequence of other previously or subsequently calculated skelfiles to create a graphical sequence of 3-D skeletonization images that reveal the progress of the faults or fractures generated by the well procedure or subsurface event that has been monitored (e.g., fracking or perforation). In another embodiment the sequence of skelfiles may be combined into one display with the data values color coded based on the time stamp associated with the time interval associated with each of the sequence of skelfiles.

The embodiments of stacking techniques described above are not mutually exclusive and may be used in combination to extract more useful information from the data. For example, the ratio of the maximum stack to the average stack can be used as a quantitative indicator of the relative strengths of the fault and fracture zones.

In one embodiment, filtering may be performed before stacking, or before filtering. Any combination of the previously described filtering and stacking techniques, and other filtering and stacking techniques which will be apparent to one skilled in the art, may be used.

The output from the filtering and stacking, or stacking and filtering, processes is an SET spatial volume representing the skeletonization time period. The data in this SET spatial volume is then input to the skeletonization process. The goal of the skeletonization process is create an image of the fracture or fault zones.

One basis for the above-described techniques is the observation that over a period of time the locations of highest semblance values, which are interpreted as a measure of seismic energy release, are geographically stable. This is consistent with empirical data showing that crack density increases logarithmically as the surface of the discontinuity is approached. See, for example, "The process zone: A microstructural view of fault growth", Jan M. Vermilye and Christopher H. Scholz, Journal of Geophysical Research, 1998, Vol. 103, No B6, pp 12,223-12,237, the disclosure of which is incorporated by reference herein in its entirety. Thus as regions of higher crack density, fracture and/or fault zones should be expressed as geographically stable zones of relatively high seismic energy release. Seismic energy $E_s$ emitted by crack failure may be expressed as:

$$E_s \cong \frac{1}{2}\Delta\delta\Delta\bar{u}A$$

where $\Delta\delta$=deviatoric stress; $\Delta\bar{u}$=Slip on fracture/fault surface; A=Area of slip surface. Thus, the same amount of seismic energy can be the product of either a single slip surface or of many slip surfaces whose total area is equal to that of the single slip surface.

The skeletonization process provides a means of extracting a more coherent signal from the "fuzzy" data cloud. The skeletonization process is based on an empirically derived equation (Vermilye and Scholz, 1998) based on field observation and measurement, relating crack density to the location of the fracture/fault discontinuity. This equation has the following form:

$$\rho = M(\ln[d]) + B$$

where $\rho$=density; d=distance from the zone discontinuity, and M and B are constants.

Skeletonization of data is a method applied to a body of 2D or 3D data points, which are typically distributed throughout a 2D or 3D uniform grid, to extract out a subset of points of the data, variously called the "skeleton" or "topological skeleton" or the "medial surface" or the "medial axes" or the "medial subset" or the "thinned" subset of the body of data points, which points satisfy certain criteria as being those points inside the body of data points which are "equidistant" from the "boundaries" of the body of data points. The locations of the volume not in the skeleton are assigned a special value, for example, 0, to indicate that there is no data at that location. The skeleton may share certain properties with the original body of data points such topological properties (same number of disjoint pieces, same number of holes, for example).

Several different algorithms may be employed to extract the skeleton, including "thinning" and "level sets" and "marching squares and marching cubes" methods, described below. Other algorithms include morphological operators, curve evolution, determining the ridge points of a distance function, and shape peeling without changing the topology, until convergence has been achieved.

In one embodiment in which thinning algorithms are employed, a definition of "boundary" or "border" points of the body of data points is established and the boundary points are removed, layer by layer, through successive iterations, eventually leaving just the skeleton points of the body of data points. For further references see "Directional 3D Thinning Using 8 Subiterations", Kálmán Palágyi and Attila Kuba. DGCI'99, LNCS 1568, 325-336 (1999) hereby incorporated by reference herein in its entirety.

In another embodiment using level set algorithms, a function is defined which computes a distance D(p) from points p in the data volume to the boundary of the body of data points. The level sets are the isolines (or contours) of the function D (lines consisting of points p which are a constant distance D0=D(p) from the boundary) or isosurfaces in the 3D case. The skeleton consists of all those locations lying on an isoline (or isosurfaces) at which the isoline direction (a direction tangent to the isoline or isosurface) changes abruptly (discontinuously). In the continuous case, these are singularities in the normal vector to the isoline or isosurfaces. Level set algorithms are designed to detect these singularities. The numerous approaches to the digital case dealing with the inherent instability of continuous approximation to discrete data may involve preprocessing smoothing operations, grid refinement operations, defining a suitable distance function D(p) and then applying a level set method such as the fast marching methods or singularity detection. For further information see "A Continuous Skeletonization Method Based on Level Sets", by Martin Rumpf, Alexandru Telea, Joint EUROGRAPHICS—IEEE TCVG Symposium on Visualization, 2002, which is hereby incorporated by reference herein in its entirety.

In a further embodiment, a marching cubes method is employed, which is a standard method of generating computer graphics having numerous algorithmic implementations, including a marching tetrahedrons variation, which start from the boundary of the body of data points and successively removes the points of the outer layers (isosurfaces), thereby mimicking the fire front of an irregular field of grasses whose boundaries are is simultaneously set on fire and in which the burn moves inwardly at a constant rate perpendicular to the respective boundaries until the fire collapses on itself at the "shock" points. The shock points, which correspond to the singularities of the level set methods, then constitute the skeleton of the data set. For further information see J. A. Sethian, "Level Set Methods and Fast Marching Methods", Cambridge University Press, 1999, not incorporated herein by reference, and William E. Lorensen, Harvey E. Cline: "Marching Cubes: A high resolution 3D surface construction algorithm", Siggraph 87 Proceedings, ser Computer Graphics, Vol 21, Nr. 4, 163-170 July 1987, hereby incorporated by reference herein in its entirety.

The output of the skeletonization process is one or more skeletonized data volumes representing the entire skeletonization time period, or subsets of such time period corresponding to the previously defined time lapse volumes. This output may be displayed on a computer screen as a 3D representation, or as a 3D representation which varies with time, and may be shown as a succession of images. The results may also be displayed as time or spatial slices through the data. This enables one to see the results of injecting the fracturing fluid into the formation in near real-time, and may be employed to modify the parameters of the fracturing operation as necessary.

Further processing algorithms may be applied to the skeletonization output, to remove anomalous results. In one embodiment, other attributes of the original may be computed and displayed at the locations defined by the skeleton. The results of the skeletonization process may be output for use in other geophysical and geological data analysis software.

Moreover, some of the embodiments described herein are capable of illuminating or imaging not only fractures or faults produced by fracking, but also of illuminating imaging systems of pre-existing fracture or fault networks occurring in the subsurface.

The various methods of fracture or fault imaging described herein may include acquiring or recording the ambient microseismic energy field before any well or other subsurface operations are undertaken, such as fracking, perforation, increasing, decreasing, initiating, or terminating gas and/or oil production. By recording the ambient microseismic energy field before after a well operation is initiated, a seismic background bench mark can be generated against which the perturbed seismic field may be compared. According to one embodiment, the ambient microseismic field is recorded for a period of several hours, although other appropriate periods of time may also be employed as those skilled in the art will now understand. The ambient microseismic field may also be recorded after a well operation has been carried out.

There is now described a method for assessing the effectiveness of both fracking and Natural Permeability Enhancement (NPE), or hydro-shearing. The term fracking includes within its scope any method that utilizes fluid pressures greater than Shmin (or the minimum horizontal stress in a rock formation), and whose purpose is to create new or induced fractures. The term NPE or hydro-shearing may include within its scope those processes which utilize fluid pressures that are less than Shmin and whose purpose is to cause slip on pre-existing fractures but not to create new ones, thereby enhancing the transmissive fracture/fault network. The assessment method described herein uses a fluid at pressures below Shmin, to illuminate the permeability field prior to and following a given stage. This method addresses the problem of identifying the effects on the permeability field caused by any frac or NPE method to either enhance the transmissive fracture/fault network or induce new fracture/faults of this network in contact with a well for any stage.

Fracking and NPE are important means for accessing unconventional hydrocarbon resources by either, in the case of NPE, enhancing pre-existing transmissive fractures or, in the case of fracking, create new transmissive fractures. The goal of these methods is to increase the amount of hydrocarbons that can be extracted from these rocks. For both environmental and economic reasons it is desirable to do this in the most efficient manner possible. In order to do so it is desired to reduce the amount of fracking or enhancement. Achieving this requires knowing the effects of these techniques on any given stage in terms of changes to the network of transmissive fracture/faults that are part of the reservoir permeability field. The current means of determining these affects are indirect methods such as comparison of pre and post frack fluid flows. By their nature these indirect methods cannot detect the spatial locations of the transmissive networks that are supplying the fluids. Because the Earth's brittle crust is highly heterogeneous, the spatial effects on the transmissive fracture/fault network resulting from changing fluid pressure at any point cannot be accurately predicted with current modeling capabilities. Consequently the changes must be imaged. Herein we describe methods, systems and devices that can be used to image the transmissive fracture/fault networks.

The goal of fracking or enhancement is to induce new transmissive networks to increase both the area of these networks exposed to the hydrocarbon source rock and the flow rates. A second goal is to do this in the most efficient and cost effective way. To achieve this goal there are two problems that must be addressed both, of which require imaging for their solution: (a) determining the most effective treatment locations, and (b) when to stop treatment.

Determining the Most Effective Treatment Locations

There are two parameters that generally control the most effective locations for fracking: (a) well drilling damage, and (b) the "frackability" of the rock.

Well drilling damage: Drilling of the well creates a damage zone about the well bore due to "hoop" stresses generated prior to casing the well. This damage zone, sometimes referred to as "skin", is frequently transmissive, thus the fluid pressure applied at any given stage may be transmitted along the well for distances of hundreds of meters. A consequence is that in terms of fluid production for any given stage, the results of the frac or enhancement, may not be associated with the stage being operated on but rather at some other location along the well bore.

Rock "frackability": The response of the rock to treatment is a function of the rock mechanical properties. These properties control the size of the well damage zone. For example stages embedded in more ductile rock which is less responsive to treatment are also surrounded by smaller damage zones, whereas stages in more responsive "frackable" rock are associated with larger damage zones.

As it is clearly most cost effective to frack in those locations which respond to treatment rather than those that do not, means that lack information regarding the actual location of transmissive networks contacted in any given fracking stage, as well as information regarding the "frackability" of rock in contact with the stage, will often result in a loss of time and effort, and an unnecessary use of resources.

When to Stop Treatment

There are inherent limitations imposed on the volume of rock that can be affected by any treatment at any stage of fracking. The limitation on the size of the volume affected is imposed by such things as rock properties, fluid pressure, the amount and type of energy source being used to frack, the presence of "thief zones", and so on. Thus, different treatments in different environments require different amounts of time to be effective, and at some point in time the size of the treated volume will stop growing. Once this state has been reached all further treatment is unnecessary and wasteful. Identifying the time at which this state is reached can result in both a reduced environmental impact as well as decreased treatment costs.

According to one embodiment, finding answers to the forgoing problems requires monitoring the spatial and temporal rock behavior in near real time. Measurement of pre- and post-treatment differences in fluid flow cannot determine these parameters as the spatial and temporal behavior of the rock is invisible to such measurements. In addition, because even small changes in fluid pressure can be sufficient to enhance existing fractures, the treatment itself can change the damage zone around the well. Thus, treating any given stage may lead to changes in the transmissive network associated with the now enhanced damage zone. As a result, to carry out treatment most efficiently, the temporal behavior and spatial location of the transmissive networks and damage zones should be continually monitored. We now provide specific examples of methods that may be employed to achieve the objectives, and solve the problems, outlined above.

In one embodiment that is now described in connection with FIG. 9 and the below table or flow chart, a permeability field around or near a well is illuminated and imaged using fluid or gas pressures that fall below Shmin, followed by the well being fracked in successive stages at pressures exceeding Shmin until the extent of fracking in adjoining rock formations has reached a desired extent.

Method 1

Figure 9:
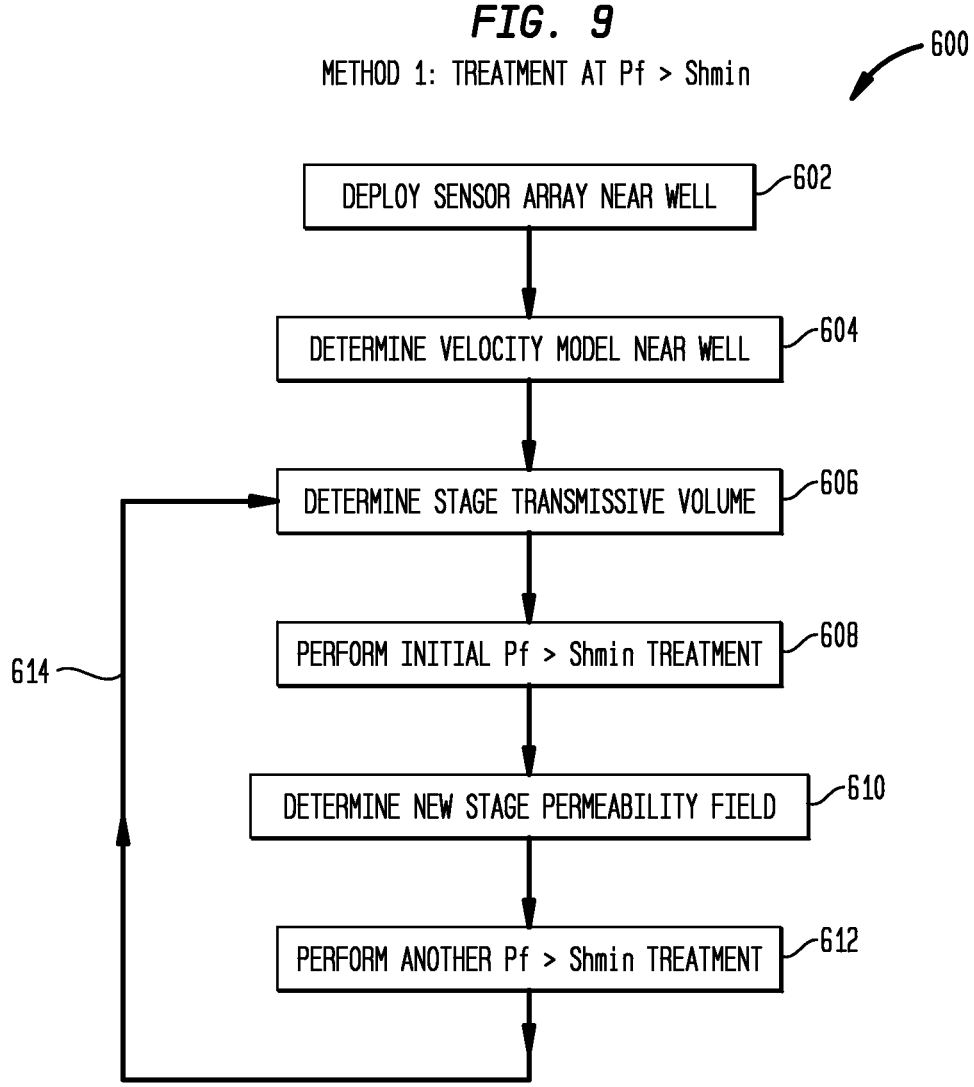
FIG. 9 shows one embodiment of a method 600 of illuminating and treating a well.

Treatment at Pf>Shmin (See Method 600 of FIG. 9)

1. Establish an Array and Velmod for the Well:
   a. Deploy a surface array of geophones or other sensors arranged in a pre-determined geometry and density to record continuously or near-continuously during the treatment operations.
   b. Develop a velocity model for the volume around or near the fracking location in the well based on seismic data acquired using the array.
2. Determine Stage Transmissive Volume:
   a. Illuminate the permeability field by pumping fluid into the well at fluid pressures which are less than Shmin.
   b. Use "Near Well Imaging TFI" methods to process continuously or near-continuously recorded seismic data. Apply "Near Real Time TFI" methods to create images of initial transmissive fracture/faults and damage cloud to determine volume and geometry of pre-existing fracture network of the initial permeability field.
3. Do Pf>Shmin treatment.
   a. Use "Near Well Imaging" technology to continuously process recorded seismic data. Apply "Near Real Time" technology to create near real time images and movies of transmissive fracture/faults and damage cloud to determine the rate of growth of the treated volume damage cloud and the geometry of induced transmissive fracture/fault network of the enhanced permeability field.
4. Determine New Stage Permeability Field
   a. Illuminate the permeability field by pumping fluid into the well at fluid pressures which are less than Shmin.
   b. Use "Near Well Imaging" technology to continuously or near-continuously process recorded seismic data. Apply "Near Real Time" technology to create near real time images of enhanced transmissive fracture/faults and damage cloud to determine volume and geometry of the enhanced stage permeability field.
5. Do next stage
6. Repeat steps 2-4.

Referring now to FIG. 9, and the above-described "Method 1," further details regarding both are now provided. In method 600 of FIG. 9, at step 602 geophones or other types of acoustic or seismic sensors are deployed near and/or around the well that is to be fracked. A seismic or acoustic velocity model is then calculated for the volume near and/or around the well, especially in the volume immediately surrounding or near the point in the well where fracking is to occur.

At step 606, the fracking stage transmissive volume is determined by illuminating the permeability field near the volume that is to be fracked by pumping gas or fluid into the well and into such volume at pressures that are less than Shmin. According to one embodiment, nitrogen gas or any other suitable gas or fluid may be employed in this step. "Near well imaging TFI" methods are then used to process continuously or near-continuously seismic data that have been or are being acquired or recorded near the volume that is to be fractured. The "Near well imaging TFI" methods are employed to create images corresponding to the initial transmissive fractures and faults, including well damage fractures and faults, to determine the volume and geometry of the pre-existing fracture and fault network in the vicinity of the volume that is characteristic of the initial permeability field.

Continuing to refer to FIG. 9, at step 608 an initial fracking stage is carried out, where a suitable fluid or gas is pumped into the target fracking volume at a pressure that exceeds Shmin, and that causes fracturing of the rock formation. During step 608, "Near well imaging TFI" methods are used to process continuously or near-continuously seismic data that have been or are being acquired or recorded near the volume that is being fractured. "Near well imaging TFI" methods are then employed at step 610 to create images corresponding to the fractures and faults created by the initial fracking stage, and to determine the volume and geometry of the fracture and fault network that has been created by the initial fracking stage, and that is characteristic of the resulting new stage permeability field.

At step 612, and if required, another fracking stage may be carried out to further enhance propagation and growth of the fracture and fault network created by fracking. As required, and according to the results provided by preceding steps, steps 606 through 612 can be repeated using step 614 until as so that the fracture and fault network reaches a suitable or desired extent in the target fracking volume disposed near or around the well.

In another embodiment that is now described in connection with FIG. 10 and the below table or flow chart, a permeability field around or near a well is illuminated and imaged using fluid or gas pressures that fall below Shmin, followed by the well being fracked in successive stages at pressures that also fall below Shmin until the extent of fracking in adjoining rock formations has reached a desired extent.

Method 2

Figure 10:
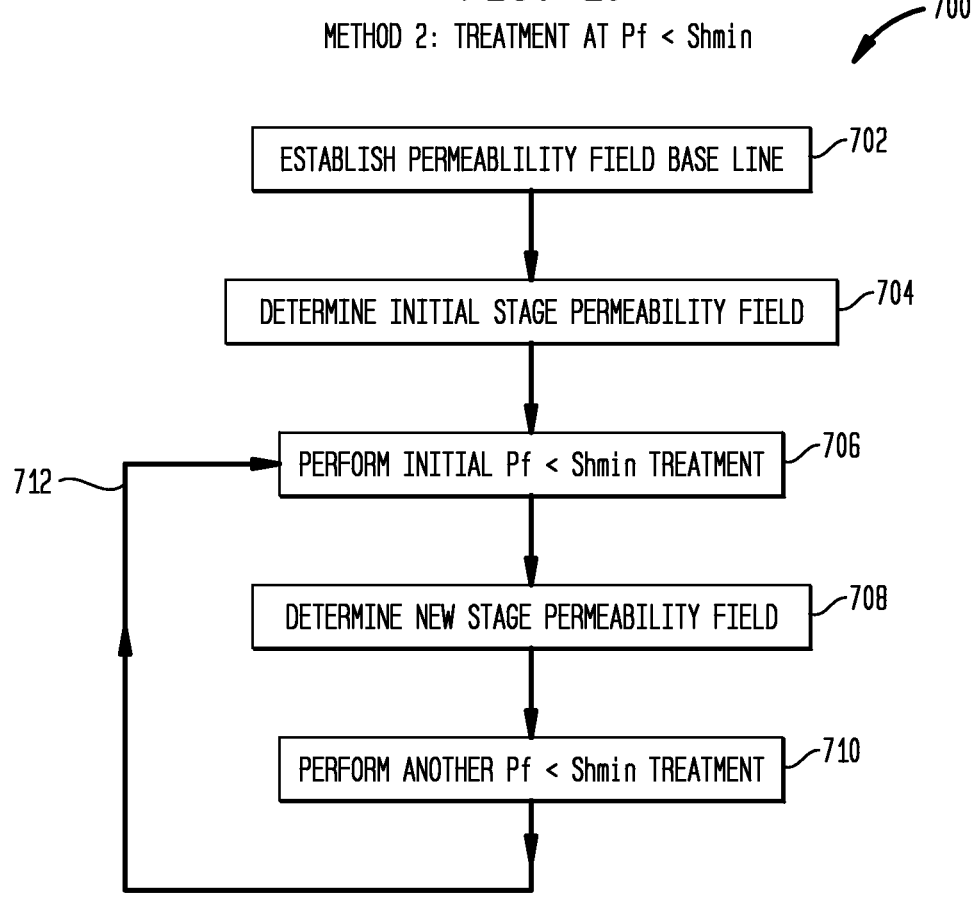
FIG. 10 shows another embodiment of a method 700 of illuminating and treating a well.

Treatment at Pf<Shmin (See Method 700 of FIG. 10)

1. Establish permeability field base line:
a. Deploy a surface array of geophones or other sensors arranged in a pre-determined geometry and density to record continuously or near-continuously during the treatment operations.
b. Develop a velocity model for the volume around or near the fracking location in the well.
2. Determine Initial Stage Permeability Field:
a. Illuminate the permeability field by pumping fluid into the well at fluid pressures which are less than Shmin.
b. Use "Near Well Imaging TFI" methods to continuously or near-continuously process the recorded seismic data. Apply "Near Real Time TFI" methods to create images of initial transmissive fracture/faults and damage cloud to determine volume and geometry of pre-existing fracture network of the initial stage permeability field.
3. Do Pf<Shmin treatment.
a. Use "Near Well Imaging TFI" methods to process continuously or near-continuously recorded seismic data. Apply "Near Real Time TFI" methods to create images and movies of transmissive fracture/faults and damage cloud to determine volume and geometry of induced transmissive fracture/fault network and damage cloud of the enhanced permeability field.
4. Determine New Stage Permeability Field
a. Illuminate the permeability field by pumping fluid into the well at fluid pressures which are less than Shmin.
b. Use "Near Well Imaging TFI" methods to process continuously or near-continuously recorded seismic data. Apply "Near Real Time TFI" methods to create images of enhanced transmissive fracture/faults and damage cloud to determine volume and geometry of the enhanced permeability field.
c.
5. Do next stage.
a. Repeat steps 2-5.

Referring now to FIG. 10, and the above-described "Method 2," further details regarding both are now provided. In method 700 of FIG. 10, at step 702, geophones or other types of acoustic or seismic sensors are deployed near and/or around the well that is to be fracked. A seismic or acoustic velocity model is then calculated for the volume near and/or around the well, especially in the volume immediately surrounding or near the point in the well where fracking is to occur. At step 702, the fracking stage transmissive volume is determined by illuminating the permeability field near the volume that is to be fracked by pumping gas or fluid into the well and into such volume at pressures that are less than Shmin. According to one embodiment, nitrogen gas or any other suitable gas or fluid may be employed in this step. "Near well imaging TFI" methods are then used to process continuously or near-continuously seismic data that have been or are being acquired or recorded near the volume that is to be fractured. The "Near well imaging TFI" methods are employed to create images corresponding to the initial transmissive fractures and faults, including well damage fractures and faults, to determine the volume and geometry of the pre-existing fracture and fault network in the vicinity of the volume that is characteristic of the initial permeability field (step 704).

Continuing to refer to FIG. 10, at step 706 an initial fracking stage is carried out, where a suitable fluid or gas is pumped into the target fracking volume at a pressure that is less than Shmin, but that causes some fracturing or enhancement of existing fractures or faults in the rock formation. During step 706, "Near well imaging TFI" methods are again used to process continuously or near-continuously seismic data that have been or are being acquired or recorded near the volume that is being fractured at pressures less than Shmin. "Near well imaging TFI" methods are then employed at step 708 to create images corresponding to the fractures and faults created by the initial low-pressure fracking stage, and to determine the volume and geometry of the fracture and fault network that has been created by the initial low-pressure fracking stage, and that is characteristic of the resulting new stage permeability field.

At step 710, and if required, another low-pressure fracking stage may be carried out to further enhance propagation and growth of the fracture and fault network created by fracking. As required, and according to the results provided by preceding steps, steps 706 through 710 can be repeated using step 712 until the fracture and fault network reaches a suitable or desired extent in the target fracking volume disposed near or around the well.

Figure 11:
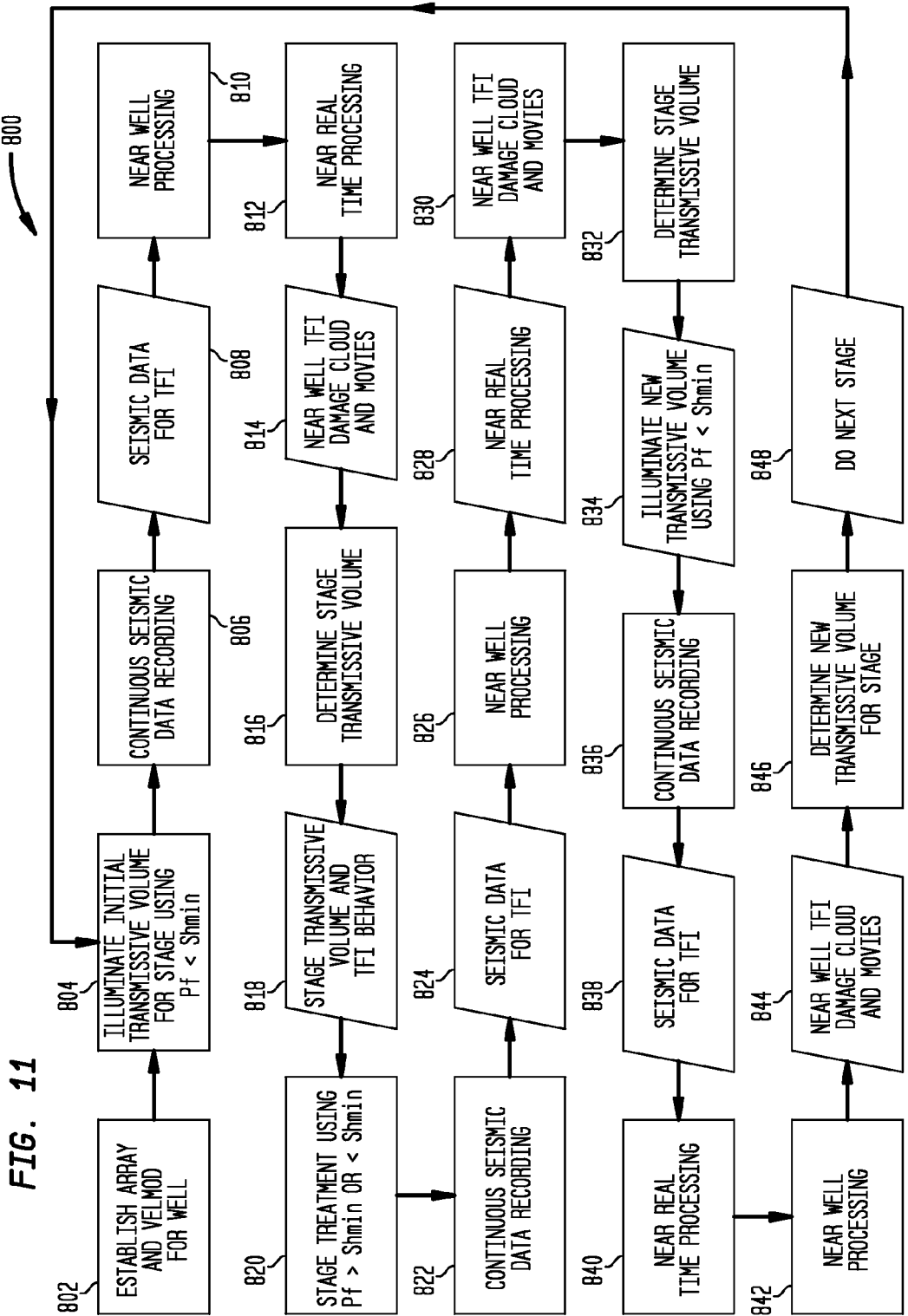
FIG. 11 shows one embodiment of a workflow or method corresponding to methods 600 and 700 of FIGS. 9 and 10.

FIG. 11, and steps 802 through 849 thereof, show one embodiment of a seismic data acquisition and processing work flow corresponding to either of methods 600 or 700 of FIGS. 9 and 10 described above. As those skilled in the art will understand after having read and understood the present specification and accompanying drawings, the workflow shown in FIG. 11 may be modified to eliminate certain steps or add certain steps not shown therein according to the particular fracking operation that is at hand.

Mentioned above is a near real time TFI method. Further details concerning one embodiment of such a method and workflow is now described below.

One Embodiment of a Workflow for Near Real Time TFI Methods

Seismic data traces are recorded at each shallow well buried receiver.

A wireless or other transmitter at the shallow well sends the data trace to a field location A computer at the filed location formats the traces into records which consist of a single time window of data for each of the traces.

This group of traces is transmitted from the field location to a computing center for processing via an internet, phone or other link, such as a VPN dedicated internet link.

A data processing and computing system at the computing center reads the traces, applies geometry corrections, applies noise filters, computes semblance volumes, accumulates the semblance volumes over large clock times, and outputs seismic emission volumes.

The seismic emission volumes are sliced at the well depth and a vertical slice along the well path. These slice images are computed and output every 1 minute, by way of non-limiting example, and for an integrated time window of 5 to 10 minutes (also by way of non-limiting example). By sequencing the slices in an animation file, a movie is created that shows the fracturing activity as a function of clock time.

The animated slice file is delivered to the well site or the field location. The completion engineers can then see the fracturing activity as a function of clock time with a running delay of about 20 minutes (by way of non-limiting example).

Numerous combinations, permutations, adjustments and changes can be made to the foregoing embodiment of a near real time TFI workflow or method, as those skilled in the art will understand after having read and understood the present specification and accompanying drawings.

The methods described above may also be employed in conjunction with propellants to provide enhanced well stimulation. Thus, high energy gas fracturing (HEGF), tailored gas pulse loading or fracturing, controlled pulse pressurization or fracturing, and other well known propellant techniques may be used in conjunction with the fracking, illuminating, monitoring, imaging, data acquisition and other techniques and methods described herein.

In addition, "fracking" is generally understood to be a technique whereby a mixture of water or other fluid or gas and sand or other particulate matter (including some types of propellants) is forced down a well to create fractures in the oil- or gas-bearing rock and thus release more oil or gas. As in general it is not possible to determine which process, i.e., induced fracturing vs. reactivation of pre-existing fractures, is occurring, the term fracking can include within its scope both new or "induced" fractures or faults as well as re-activated pre-existing fractures or faults.

Figure 12:
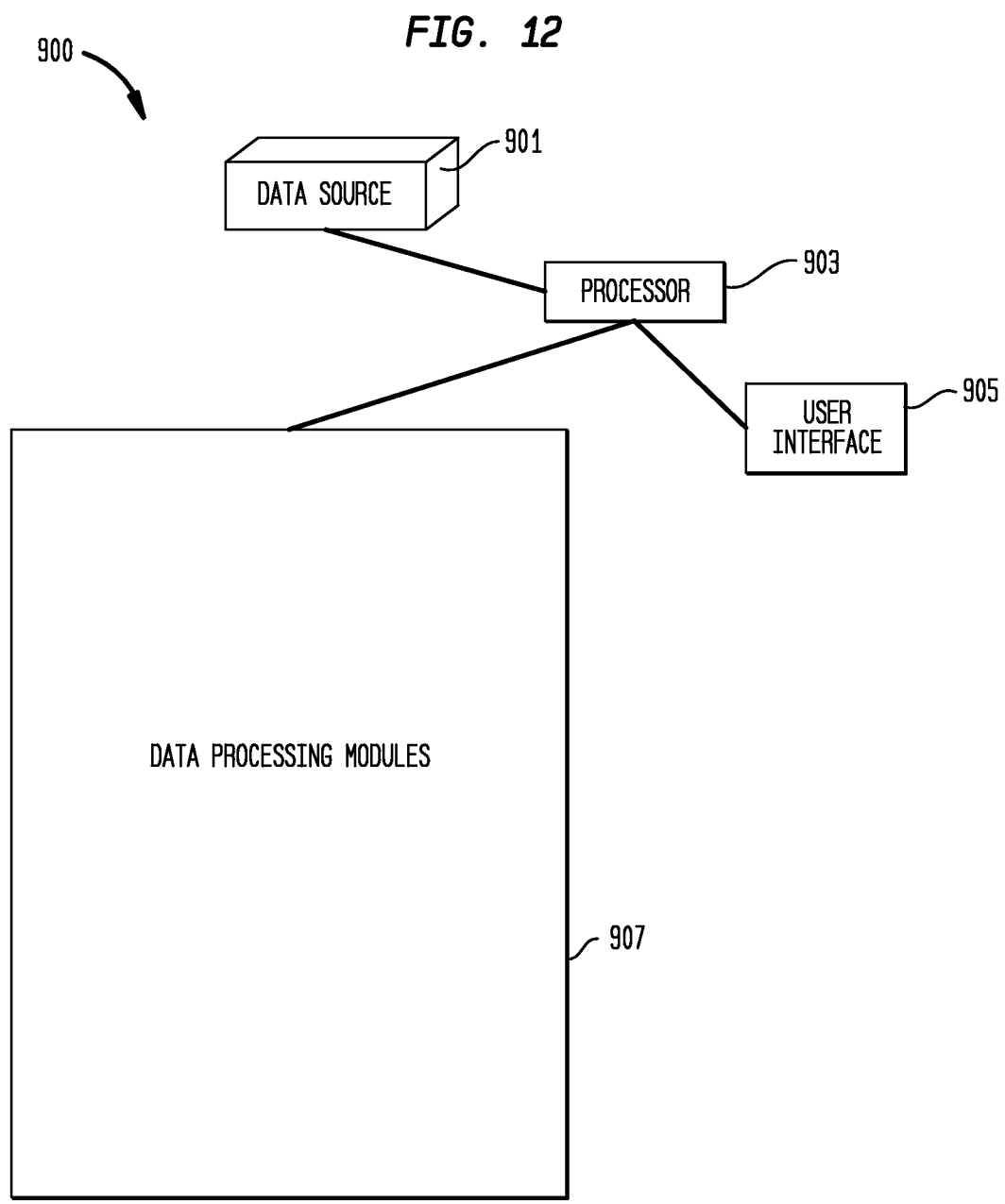
FIG. 12 shows a system configured to implement various embodiments of the methods disclosed herein.

Referring now to FIG. 12, and with further reference to FIGS. 4 through 11 and the above-described methods, systems, devices and embodiments, there is shown one embodiment of a system 900 configured to perform methods described above and in the Figures. As shown, system 900 comprises a data source/storage device 601 that includes a data storage device, computer memory, and/or a computer readable medium. Device 901 may contain or store, by way of example, petrophysical or geological data and/or synthetic petrophysical or geological data. Data from device 901 may be made available to processor 803, which may be, by way of example, a programmable general purpose computer, a CPU, a microprocessor, a plurality of processors, or any other suitable processor(s). Processor 903 is programmed with instructions corresponding to at least one of the various methods and modules described herein such that the methods or modules are executable by processor 903.

Continuing to refer to FIG. 12, and according to some embodiments, processor 903 is configured to execute one or more data processing modules 907 that are configured to implement the above-disclosed methods, including the methods shown in FIGS. 4 through 11.

Data processing modules other than those shown in FIGS. 4 through 11 are contemplated according to the various embodiments of the methods disclosed herein, as those skilled in the art will understand after having read and understood the present specification and drawings.

Still referring to FIG. 12, system 900 may also comprise interface components such as user interface 905. User interface 905 may be used to display data and processed data products (such as with a computer monitor or display), and to allow the user to select among options for implementing aspects of the method (such as with a mouse and/or keyboard). By way of example and not limitation, first and second sets of data combined to form a third set of data as computed by processor 903 may be displayed on user interface 905, stored on data storage device or memory 901, or both displayed and stored.

The above-described embodiments should be considered as examples, rather than as limiting the scope of the various embodiments. In addition to the foregoing embodiments, review of the detailed description and accompanying drawings will show that there are other embodiments not explicitly disclosed herein. Accordingly, many combinations, permutations, variations and modifications of the foregoing embodiments not set forth explicitly herein will nevertheless fall within the scope of what is claimed herein.

We claim:

1. A method of monitoring or assessing the effectiveness of a fracking operation in a well, comprising:
    deploying and activating an array of seismic sensors near or around a well that is to be fracked;
    determining at least an initial seismic or acoustic velocity model for a first volume near or around the well that is to be fracked;
    determining a fracking stage transmissive volume by illuminating a permeability field near or in the first volume by pumping gas or fluid into the well at pressures sufficient to cause slip on pre-existing fractures but not sufficient to cause new fractures;
    employing near-well tomographic fracture imaging methods to process continuously or near-continuously seismic data that have been or are being acquired or recorded during said illumination of said permeability field near or in the first volume;
    generating images corresponding to initial transmissive fractures and faults located in the first volume to determine a geometry of a pre-existing first fracture or fault network in, or in the vicinity of, the first volume that is characteristic of an initial permeability field;
    carrying out a first fracking stage in the well and near or in the first volume, where a suitable fluid or gas is pumped into at least the first volume at a pressure sufficient to cause new fractures;

employing near-well tomographic fracture imaging methods to process continuously or near continuously seismic data that have been or are being acquired or recorded near the at least first volume that is being fractured in the first fracking stage;

employing near-well tomographic fracture imaging methods to generate images representing fractures or faults created by the first fracking stage, and determining a second volume and geometry of a second fracture and fault network that has been created by the first fracking stage, and that is characteristic of a resulting new stage permeability field.

2. The method of claim 1, further comprising carrying out a second fracking stage to further enhance propagation and growth of the fracture and fault network created by the first fracking stage.

3. The method of any of claim 1 or 2, further comprising repeating any of the steps recited therein in accordance with the results provided thereby.

4. The method of any of claim 1, 2 or 3, further comprising repeating any of the steps recited therein until the fracture and fault network reaches a suitable or desired extent in the first or second volume.

5. The method of claim 1, further comprising employing near real time tomographic fracture imaging methods after or in conjunction with any of the near-well tomographic fracture imaging methods.

6. The method of claim 1, wherein the fluid or gas comprises nitrogen, water, carbon dioxide, methane, or natural gas.

7. The method of claim 1, wherein the fluid or gas comprises a propellant.

8. The method of claim 7, wherein at least portions of the propellant are detonated, ignited or deflagrated.

9. The method of claim 1, wherein the second volume includes at least portions of the first volume.

10. The method of claim 1, further comprising voxel value filtering the seismic data.

11. The method of claim 10, wherein the voxel value filtering further comprises computing at least one local maximum in the voxels.

12. The method of claim 10, wherein voxel value filtering further comprises passing voxel values that exceed a predetermined minimum value.

13. The method of claim 10, wherein voxel value filtering further comprises filtering the seismic data to pass a predetermined percentage of the highest voxel values associated therewith.

14. The method of claim 10, wherein voxel value filtering further comprises filtering each the seismic data to pass voxel values that exceed a calculated value computed on the basis of a range of values in the seismic data.

15. The method of claim 10, further comprising stacking the voxel value filtered data.

16. The method of claim 10, wherein the voxel values in SET spatial volumes correspond to semblance values.

17. The method of claim 1, further comprising acquiring a microseismic SET data set for use in the method.

18. The method of claim 10, further comprising disposing at least some of the sensors along the surface of the earth.

19. The method of claim 18, further comprising disposing at least some of the sensors beneath the surface of the earth in at least one borehole.

* * * * *